United States Patent
Bilal et al.

(10) Patent No.: US 10,473,162 B1
(45) Date of Patent: Nov. 12, 2019

(54) UNIVERSAL CONSTANT VELOCITY JOINT SYSTEM AND METHOD OF USE

(71) Applicants: Haitham Hussein Bilal, Sherman, TX (US); Raed Zuhair Hasan, Greenville, SC (US)

(72) Inventors: Haitham Hussein Bilal, Sherman, TX (US); Raed Zuhair Hasan, Greenville, SC (US)

(73) Assignee: Advanced Innovative Solutions, LLC, Greenville, SC (US)

( * ) Notice: Subject to any disclaimer, the term of this patent is extended or adjusted under 35 U.S.C. 154(b) by 29 days.

(21) Appl. No.: 15/207,648

(22) Filed: Jul. 12, 2016

(51) Int. Cl.
*F16D 3/32* (2006.01)
*F16D 3/223* (2011.01)
*B60B 27/00* (2006.01)

(52) U.S. Cl.
CPC ............... *F16D 3/32* (2013.01); *F16D 3/223* (2013.01); *B60B 27/0042* (2013.01); *F16D 2003/22326* (2013.01); *Y10S 464/904* (2013.01); *Y10S 901/26* (2013.01)

(58) Field of Classification Search
CPC .. F16D 3/32; F16D 3/223; F16D 2003/22326; B60B 27/0042; Y10S 464/904; Y10S 901/26
USPC ........................... 464/106, 109, 110; 475/336
See application file for complete search history.

(56) References Cited

U.S. PATENT DOCUMENTS

| | | | | |
|---|---|---|---|---|
| 4,686,866 A | * | 8/1987 | Rosheim | B25J 9/104 901/26 |
| 4,878,393 A | * | 11/1989 | Duta | B25J 17/0275 464/106 |
| 5,498,208 A | * | 3/1996 | Braun | F16D 3/40 464/109 |

* cited by examiner

*Primary Examiner* — Greg Binda
(74) *Attorney, Agent, or Firm* — Kim and Lahey Law Firm LLC; Douglas W. Kim

(57) ABSTRACT

A constant velocity (CV) joint system include a CV joint assembly with a first elongated ring pivotally attached to a second elongated ring via a first rotating housing and a second rotating housing, the first rotating housing and the second rotating housing being configured to rotate along a first axis; a third elongated ring pivotally attached to a fourth elongated ring via a third rotating housing and a fourth rotating housing, the third rotating housing and the fourth rotating housing being configured to rotate along a second axis; a first sliding support; and a second sliding support. The first sliding support includes a first elongated opening; and a second elongated opening, the first elongated opening extending in a direction relatively perpendicular to the second elongated opening. The second sliding support includes a third elongated opening and a fourth elongated opening, the third elongated opening extending in a direction relatively perpendicular to the fourth elongated opening.

14 Claims, 34 Drawing Sheets

UNIVERSAL CONSTANT VELOCITY JOINT SYSTEM AND METHOD OF USE

BACKGROUND

1. Field of the Invention

The present invention relates generally to universal constant velocity joints and methods of use.

2. Description of Related Art

Constant velocity joint, commonly known as CV joint, is a mechanical coupling between two rotating shafts, configured to allow a drive shaft to transmit power, motion, or both through a fixed or variable angle, at constant rotational speed, without an appreciable increase in friction or play. The axes of the shafts are always intersecting and the bending angle between them is permitted to change during operation. In one application of use, the CV joints can be used with vehicles, for example, used in front wheel drive vehicles. It should be understood that many modern rear wheel drive cars with independent rear suspension typically use CV joints at the ends of the rear axle shafts. It will be appreciated that the CV joints could also be used on other types of applications of use wherein input power is used at a variable angle relative to the receiving shaft.

The "Cardan joint" (also called "Hooke's joint") is a well known example of a universal joint. It is noted that the Cardan joint transmits rotary motion but does not ensure that the angular velocities of the shafts are equal at all times. A constant velocity universal joint, on the other hand, is a universal joint that transmits a rotary motion while keeping the angular velocities of the shafts equal at all times.

True constancy of angular velocity transmission is achieved by a widely used arrangement of two Cardan joints in series, the output member of the first joint comprising the input member to the second joint. It is noted, however, that the constancy is kept only under strict geometrical requirements: both input and output shafts must lie in one plane and both bending angles of the two Cardan joints must be kept equal at all times. This principle is used in the so called double Cardan universal joint, as described for example in U.S. Pat. Nos. 4,257,243 and 5,419,740, where two Cardan joints are connected by a relatively short intermediate member designed to meet said geometrical requirements.

Another known constant velocity universal joint, which is commonly used in motor vehicle front-wheel drives, is the Rzeppa joint as described in U.S. Pat. No. 7,393,283. It operates on the basic principle that constancy of transmission is ensured when the contact point or points between the two shafts lie in the so called "homokinetic plane" of the joint. This plane is normal to the plane defined by the two shaft axes and lies along the bisector of the angle between the two shaft axes. The Rzeppa joint consists of a cage that keeps six balls in the homokinetic plane at all times. A further development of the Rzeppa joint, that allows not only angular but also axial relative movement of the shafts, is described in U.S. Pat. No. 4,573,947. One of the geometrical constrains in the Rzeppa joint is the limited range of angular bending between the input and output shafts.

Examples of other types of universal joints, or constant velocity universal joints, like Tracta constant velocity joint, tripod joint, Thompson coupling, Martin GECIK joint and other relative prior art joints are described in U.S. Pat. Nos. 4,331,003, 6,682,435, 4,786,270, 7,144,326, US20140141893, U.S. Pat. Nos. 1,975,758 3,036,446, 4,686,866, 4,773,890, 5,167,583, 6,409,413, 5,954,586 and 5,256,107.

Accordingly, although great strides have been made in the area of CV joints, many shortcomings remain, especially in the limited range of angular bending between the input and output shafts.

DESCRIPTION OF THE DRAWINGS

The novel features believed characteristic of the non-limiting embodiments of the present application are set forth in the appended claims. However, the non-limiting embodiments themselves, as well as a preferred mode of use, and further objectives and advantages thereof, will best be understood by reference to the following detailed description when read in conjunction with the accompanying drawings, wherein:

Figure 1:
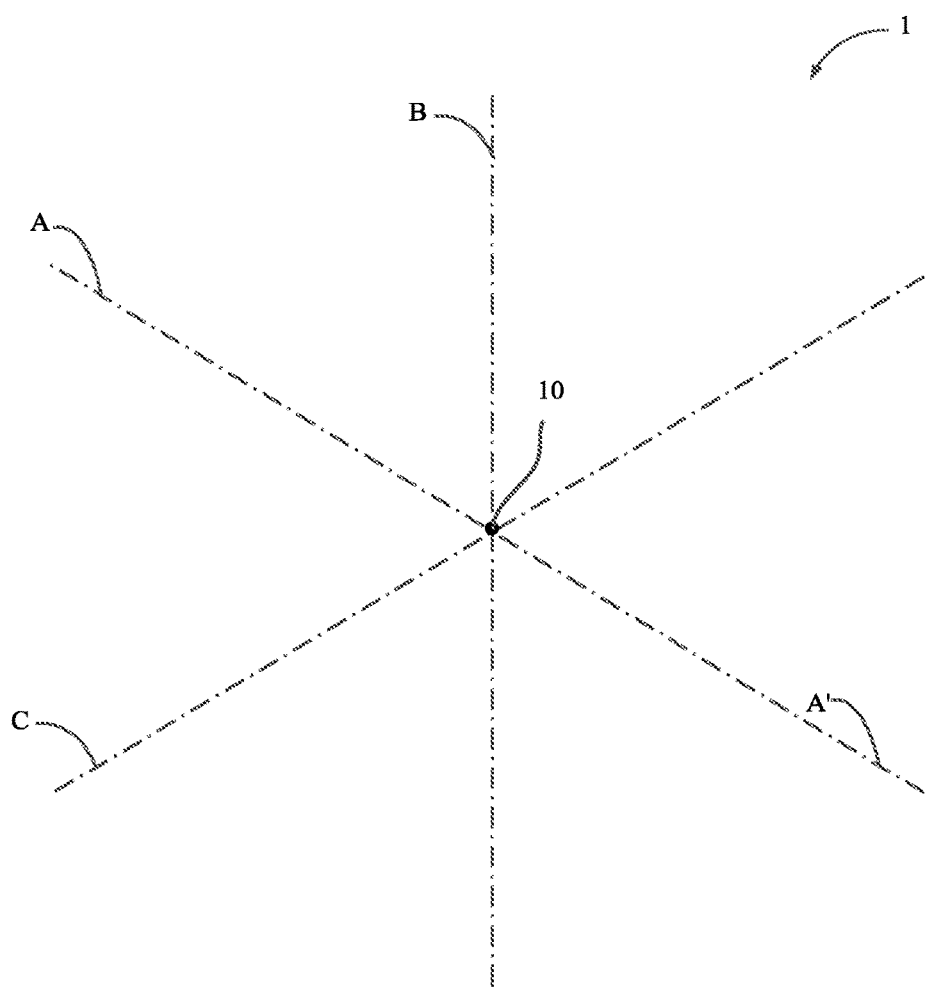
FIG. 1 is a perspective view of a coordinate system.
Figure 1:
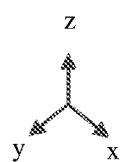

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIGS. 1-32 depict various views of a CV joint assembly 50 in accordance with a preferred embodiment of the present application. Detailed explanation of the CV joint assembly 50 and method of use are discussed below and shown in the accompanying drawings.

In FIG. 1, a perspective view of a coordinate system 1 is shown having axes A-A', B, and C intercepting at a geometric center 10, which is considered the geometric center of the CV joint as discussed below and shown in the accompanying drawings. The system 1 is utilized to determine reference positions as the components of the CV joint assembly pivotally move in relative to each other around the geometric center 10.

Figure 2A:
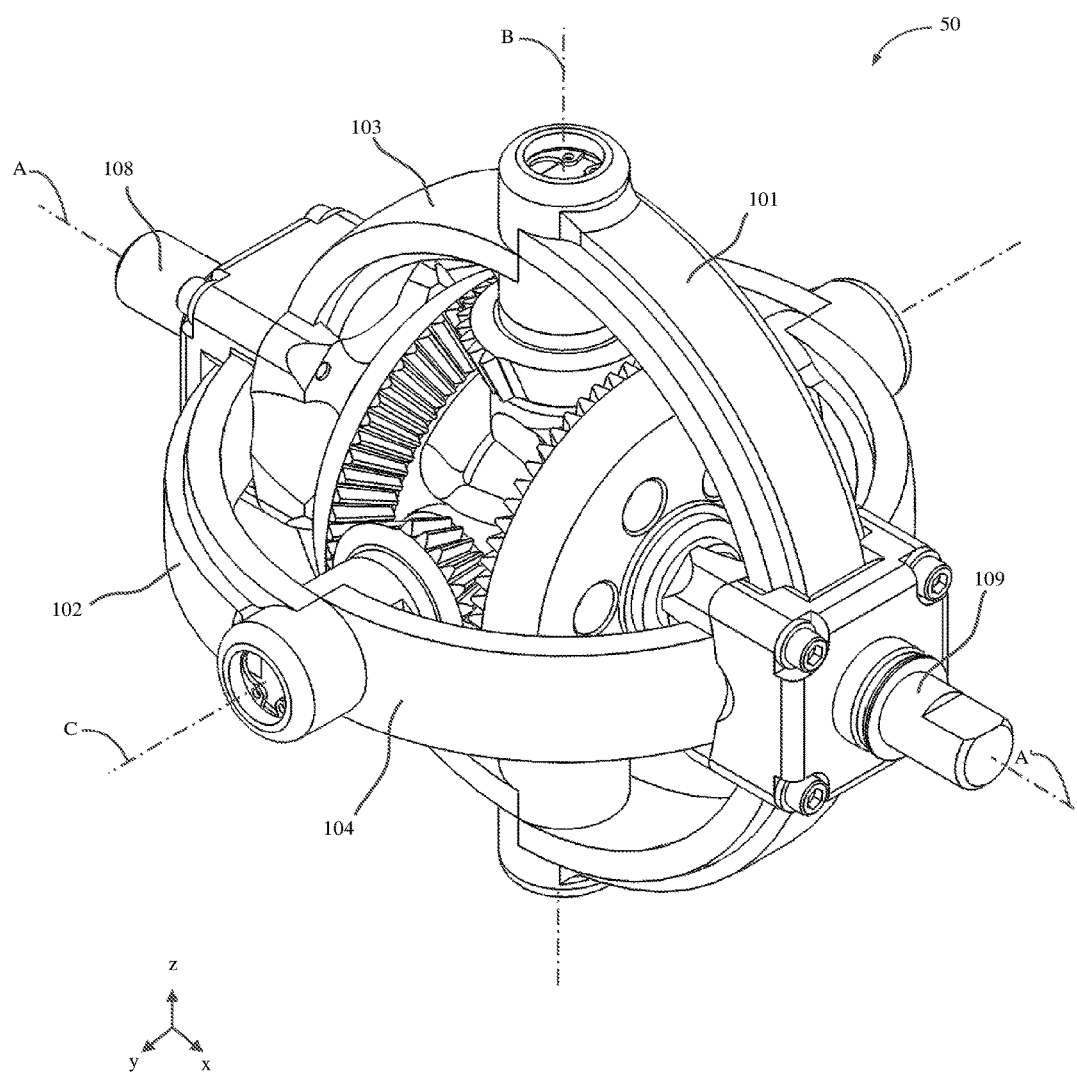
FIG. 2A is a perspective view of a CV joint assembly.
Figure 2B:
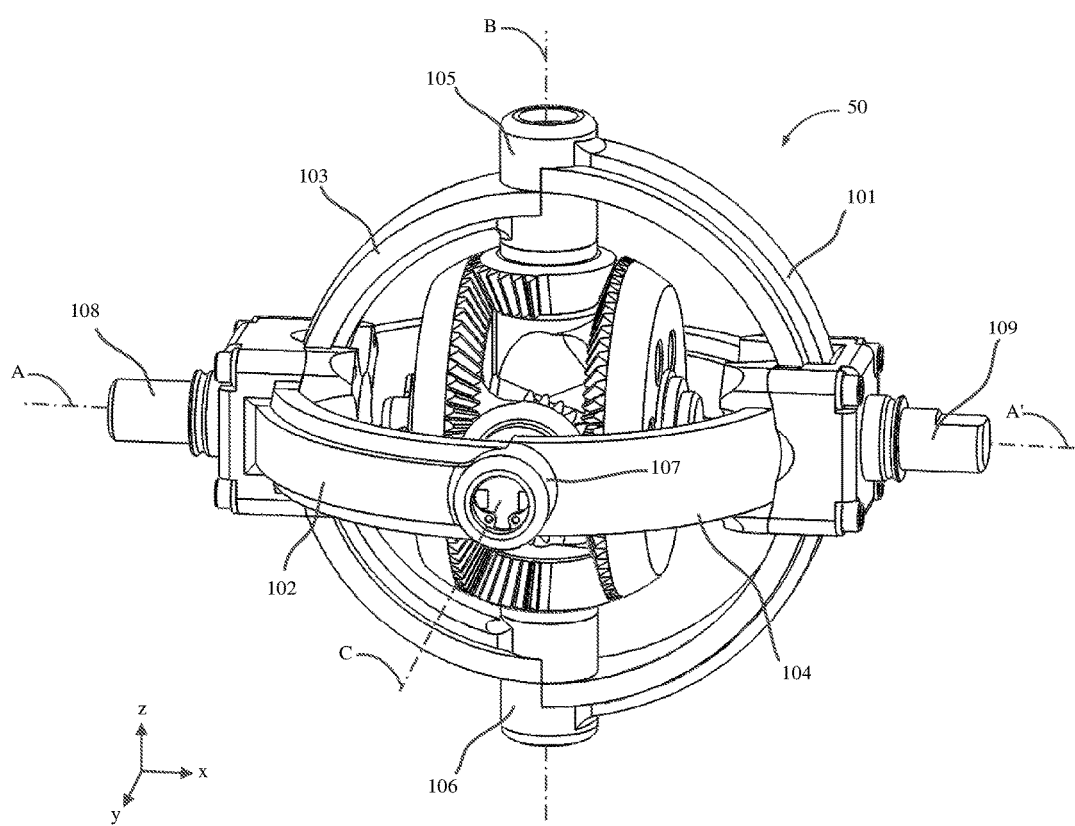
FIG. 2B is another perspective view of a CV joint assembly.

In FIGS. 2A and 2B, a perspective view of a CV joint assembly 50 having outer and inner rings is shown. A primary inner support ring 103 is pivotally attached to primary outer support ring 101 through a first outer housing 105 and a second opposing outer housing 106, while a secondary inner support ring 104 is pivotally attached to secondary outer frame ring 102 through first outer housing 107 and second opposing outer housing from the other side of the CV joint. The rings engage with a first coupling shaft end 108 and a second coupling shaft end 109 through sliding support subassembly where axis A-A' is passing through the center line of the coupling shafts 108 and 109.

Figure 3A:
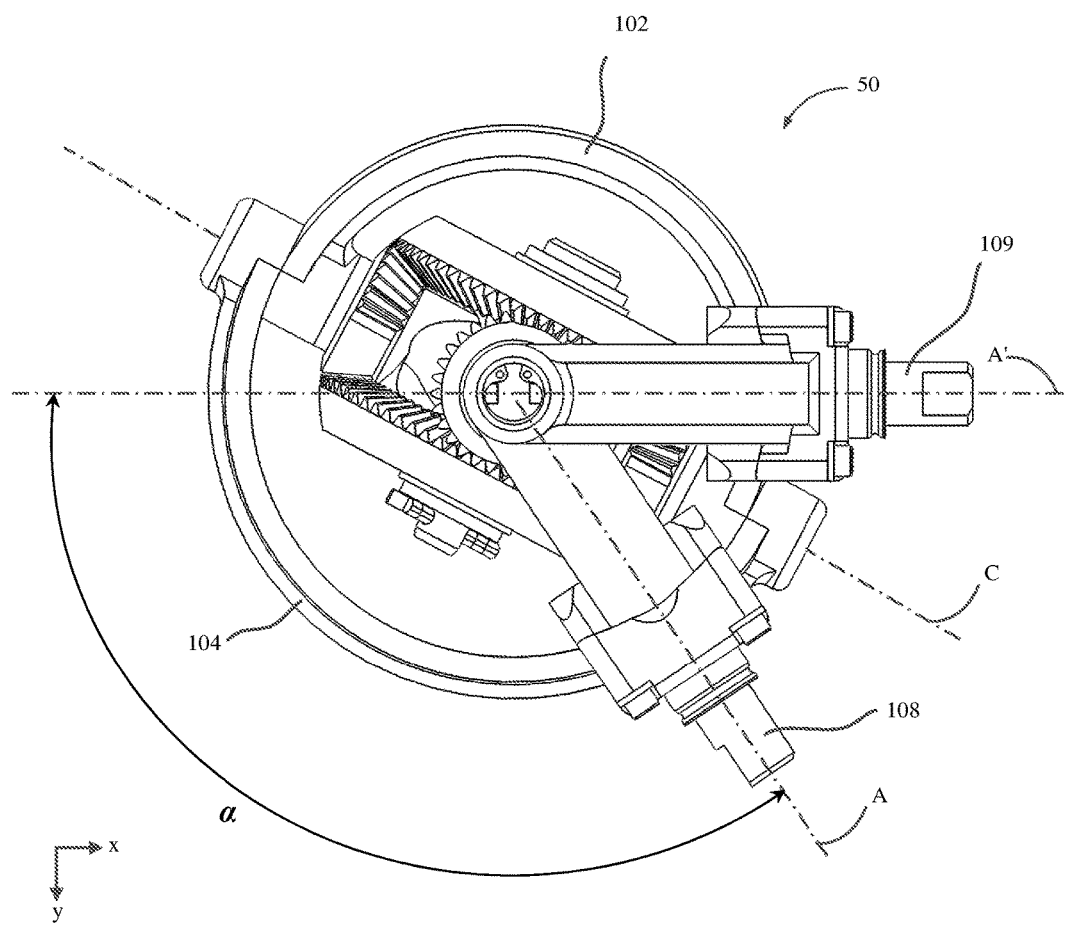
FIG. 3A is a top view of a CV joint assembly with roll range of motion.
Figure 3B:
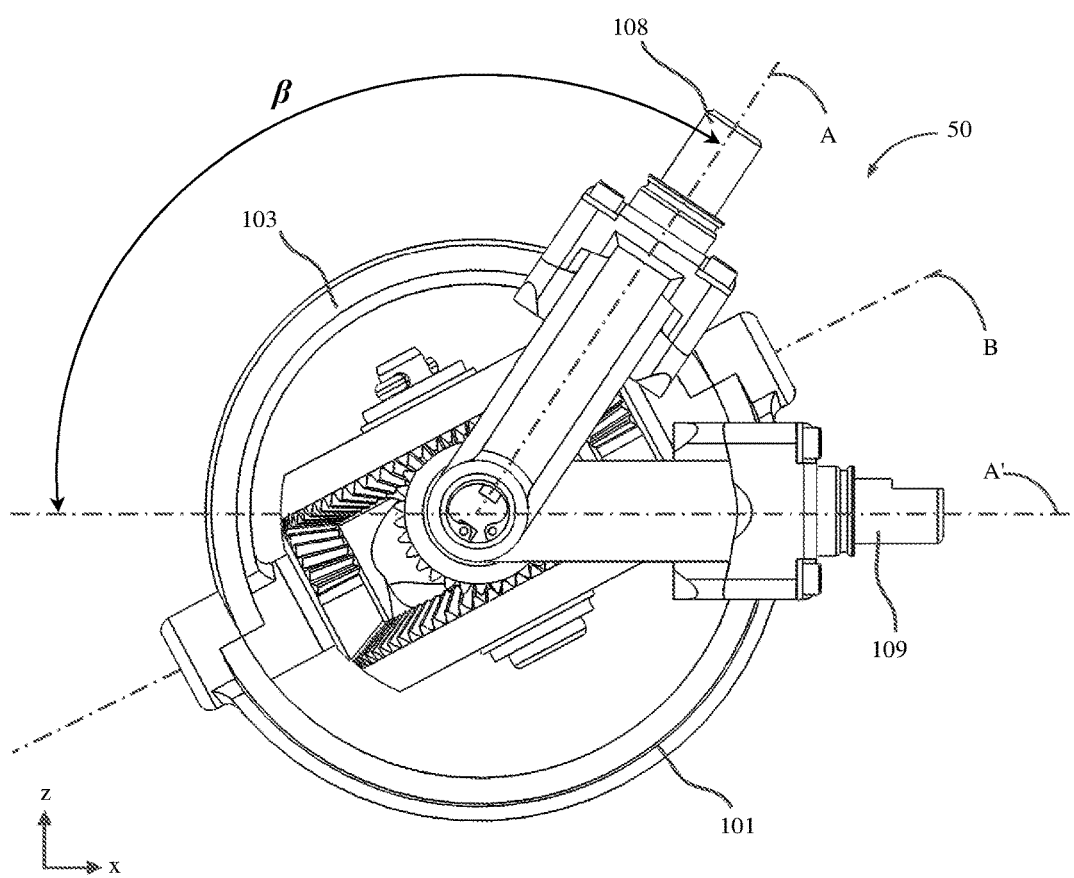
FIG. 3B is a front view of a CV joint assembly with pitch range of motion.
Figure 4:
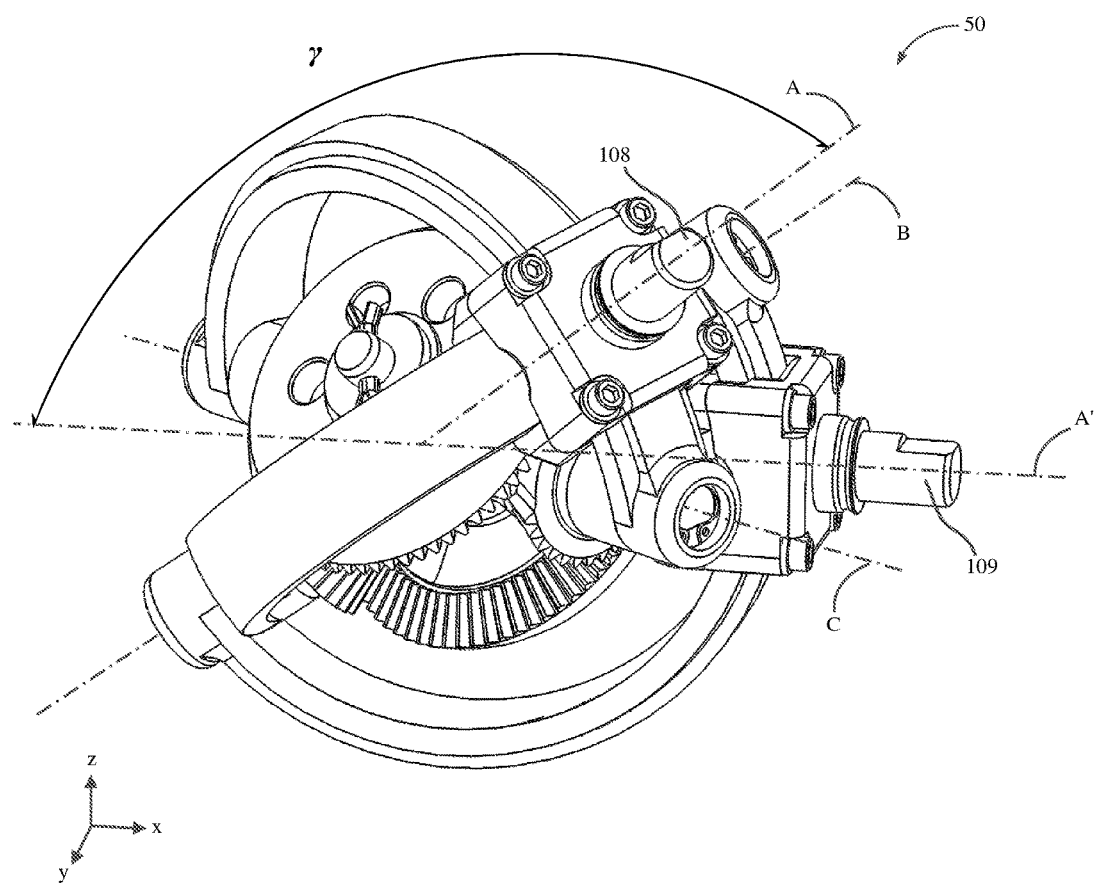
FIG. 4 is another perspective view of a CV joint assembly with both roll and pitch range of motion.

In FIG. 3A, respective top view of CV joint assembly 50 with a roll motion as indicated by a angle and range of motion is shown. The roll range of motion in this non-limiting embodiment can reach to 155 degree. In FIG. 3B, respective front view of CV joint assembly 50 with a pitch motion as indicated by β angle and range of motion is shown. The pitch range of motion in this non-limiting embodiment can reach to 155 degree. In FIG. 4, the CV joint assembly 50 is shown with both roll and pitch motions simultaneously indicated by γ angle and range of motion. It should be noted that in this CV joint assembly 50, the roll and pitch movements are independent of each other, and the whole CV joint assembly 50 can rotate freely around axis A-A'.

Figure 5:
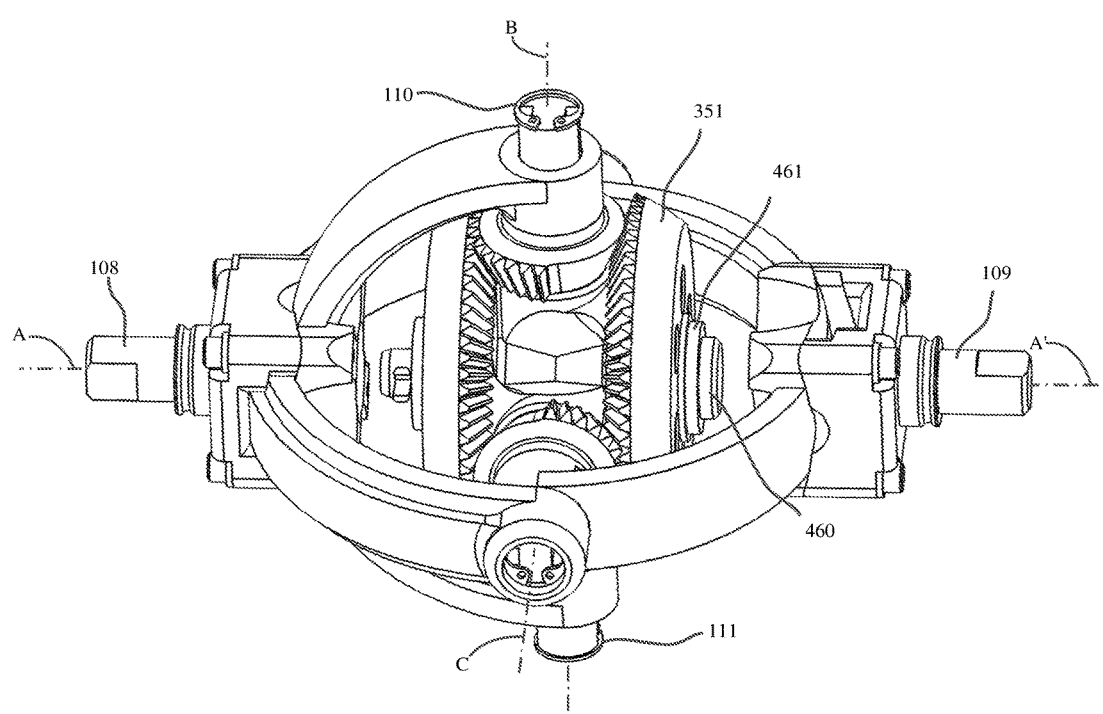
FIG. 5 is another perspective view of a CV joint assembly (without primary outer frame ring)

In FIG. 5, a perspective view of the CV joint assembly 50 is shown without the outer frame rings 101 for clarity. The assembly 50 is further provided with one or more internal C-clips 110, 111 for assembly purposes.

Figure 6:
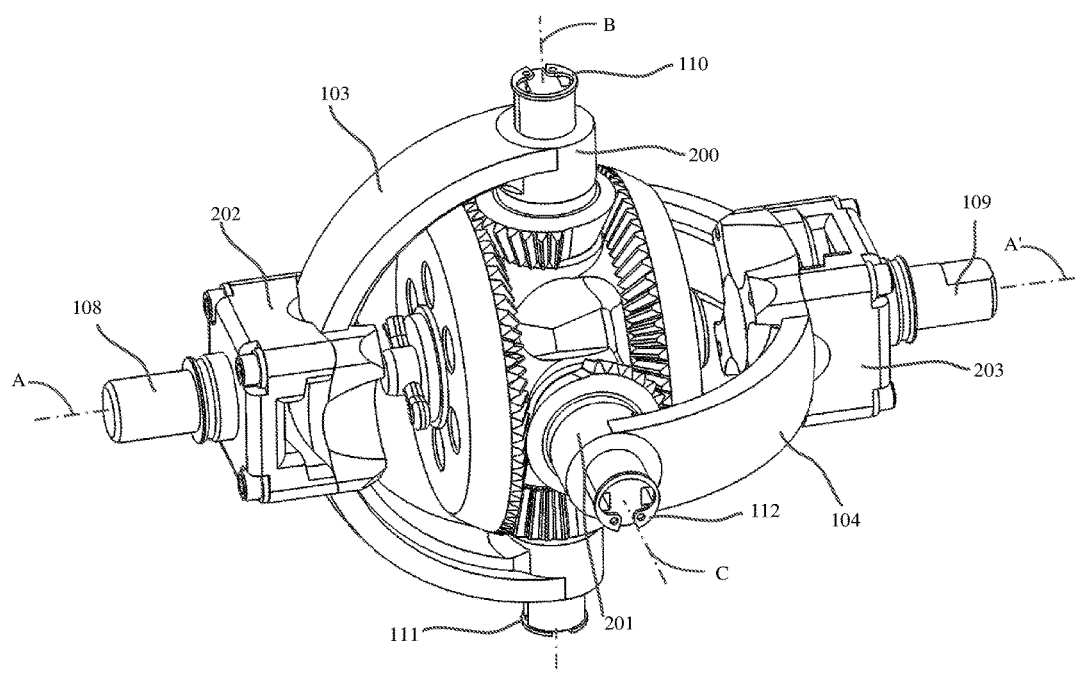
FIG. 6 is another perspective view of a CV joint assembly (without secondary outer frame ring)

In FIG. 6, a perspective view of a CV joint assembly 50 is shown without the outer frame rings 101,102 for clarity. The CV joint assembly 50 is further provided with inner housing feature 200 having an interior cavity and rigidly attached to the first inner ring 103, and likewise, a second inner housing feature 201 having an interior cavity and rigidly attached to the first inner ring 104. A first upper sliding support 202 is configured to engage with and slide relative to the first outer ring 102 (See FIG. 2B), while a second upper sliding support 203 is configured to engage with and slide relative to the second outer ring 101. The assembly 50 is further provided with one or more internal C-clips 110, 111, 112 for assembly purposes. In a non-limiting embodiment, inner housing feature 200 is constructed as an integrated part of the first inner ring 103, and likewise, the second inner housing feature 201 is constructed as an integrated part of the second inner ring 104.

Figure 7:
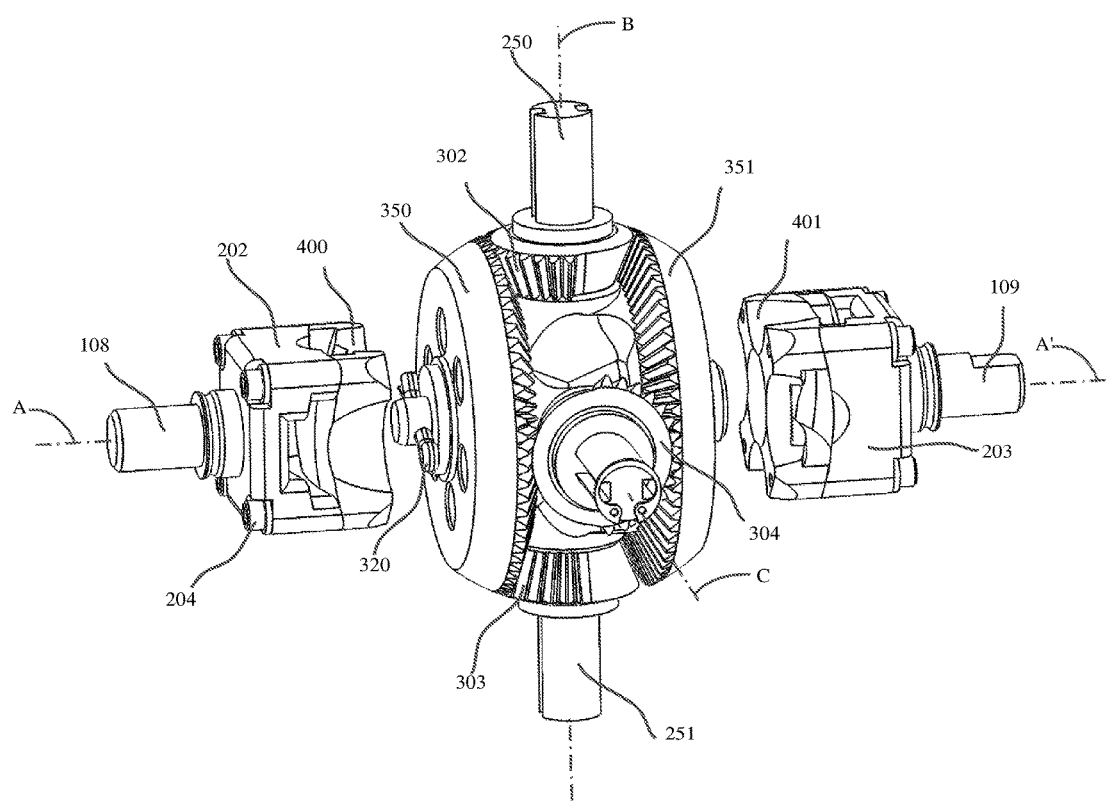
FIG. 7 is another perspective view of a CV joint assembly (without primary and secondary outer frame and inner support rings)

In FIG. 7, a perspective view of a CV joint assembly 50 is shown without the primary and secondary outer frame and inner support rings 101, 102, 103 and 104 for clarity. The assembly 50 is further provided with a first connecting rod 250 protruding through a secondary gear 302 and a second opposing connecting rod 251 protruding through a secondary gear 303. Both rods, 250 and 251 are assembled to central connecting support 451 (See FIG. 9 and FIG. 10). It should be known that in the preferred embodiment the secondary gears 302, 303 include a plurality of teeth that only extend partially around the periphery of the gear. The secondary gears 302, 303 are positioned between and meshed with a plurality of teeth associated with primary gear 350. Meanwhile the secondary gears 304 and a second opposing secondary gear on the other side are positioned between and meshed with a plurality of teeth associated with primary gear 351. In a non-limiting embodiment, primary gears 350 and 351 are positioned between lower sliding supports 400, 401, the lower sliding support 400 is configured to engage with and slide relative to the inner ring 103, and likewise, the lower sliding support 401 is configured to engage with and slide relative to the inner ring 104 (See FIG. 2B and FIG. 6). In a non-limiting embodiment, the upper sliding supports 202 and 203 are attached and secured to the lower sliding supports 400 and 401 respectively through screws 204, this subassembly of upper sliding supports 202, 203 and lower sliding supports 400, 401 provide the relative sliding mechanism on the rings 101, 102, 103 and 104 (See FIG. 2B).

Figure 8:
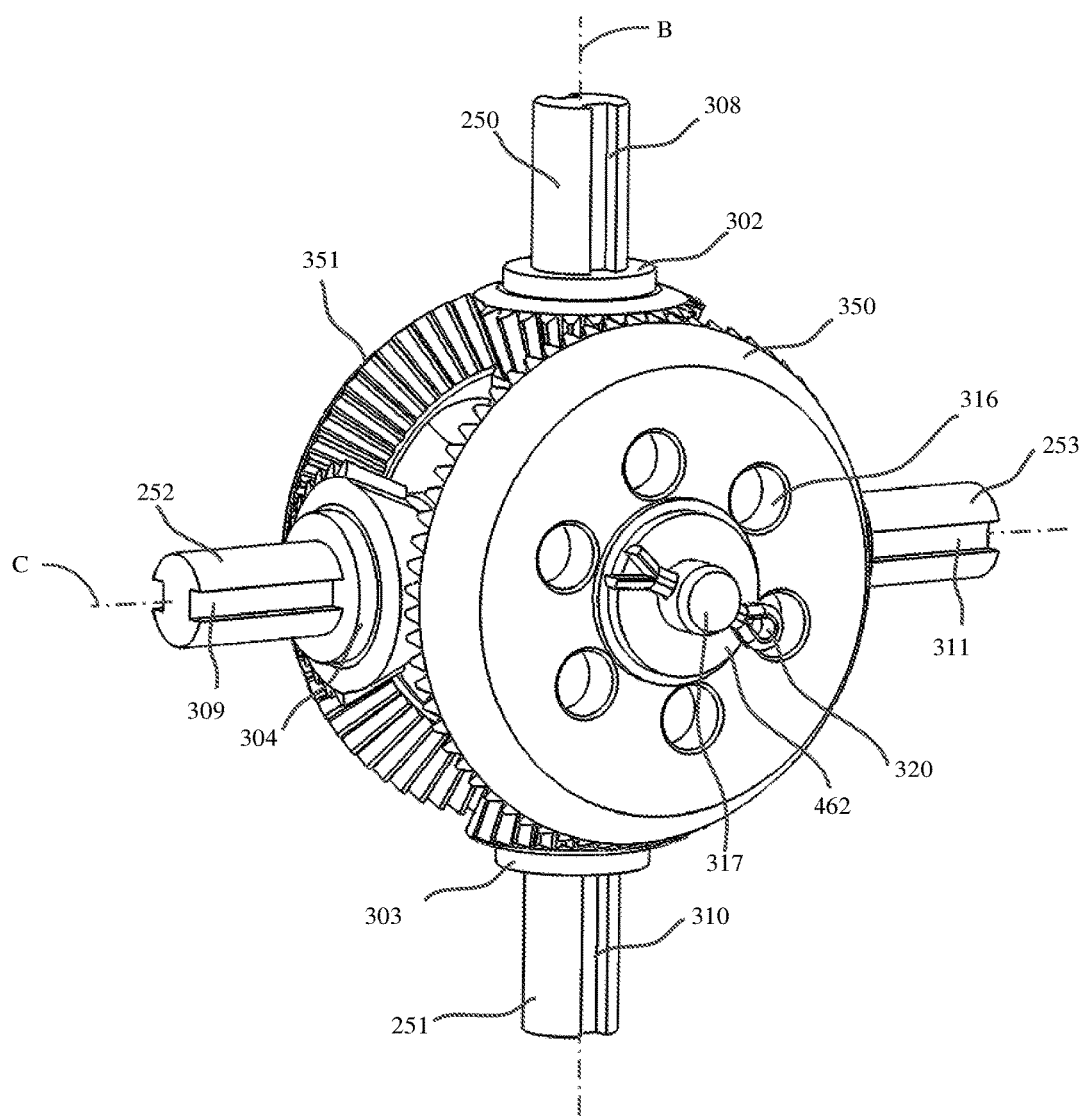
FIG. 8 is a perspective view of gears assembly mechanism and connecting rods.

In FIG. 8, a perspective view of gears assembly mechanism and the connecting rods 250, 251, 252, 253 are shown. Respective rods 250, 251 include elongated notches 308, 310, while connecting rods 252, 253 include respective notches 309, 311. Respective rods 250, 251 integrally assembled using notches 308, 310 with respective secondary gears 302, 303, while respective rods 252, 253 integrally assembled using notches 309, 311 with respective secondary gears 304, 305 (See FIG. 9). These respective notches work as key features with the respective secondary gears. The CV joint assembly 50 is further provided with a plurality opening features 316 extending through the thickness of the primary gears 350, 351 to reduce the mass of the primary gears 350, 351 (See FIG. 8). In a non-limiting embodiment, a washer 462 engages with a protrusion central pin 317 which extends through the primary gears 350, 351 and is held in position by a pin 320 extends through a hole of protrusion 317.

Figure 9:
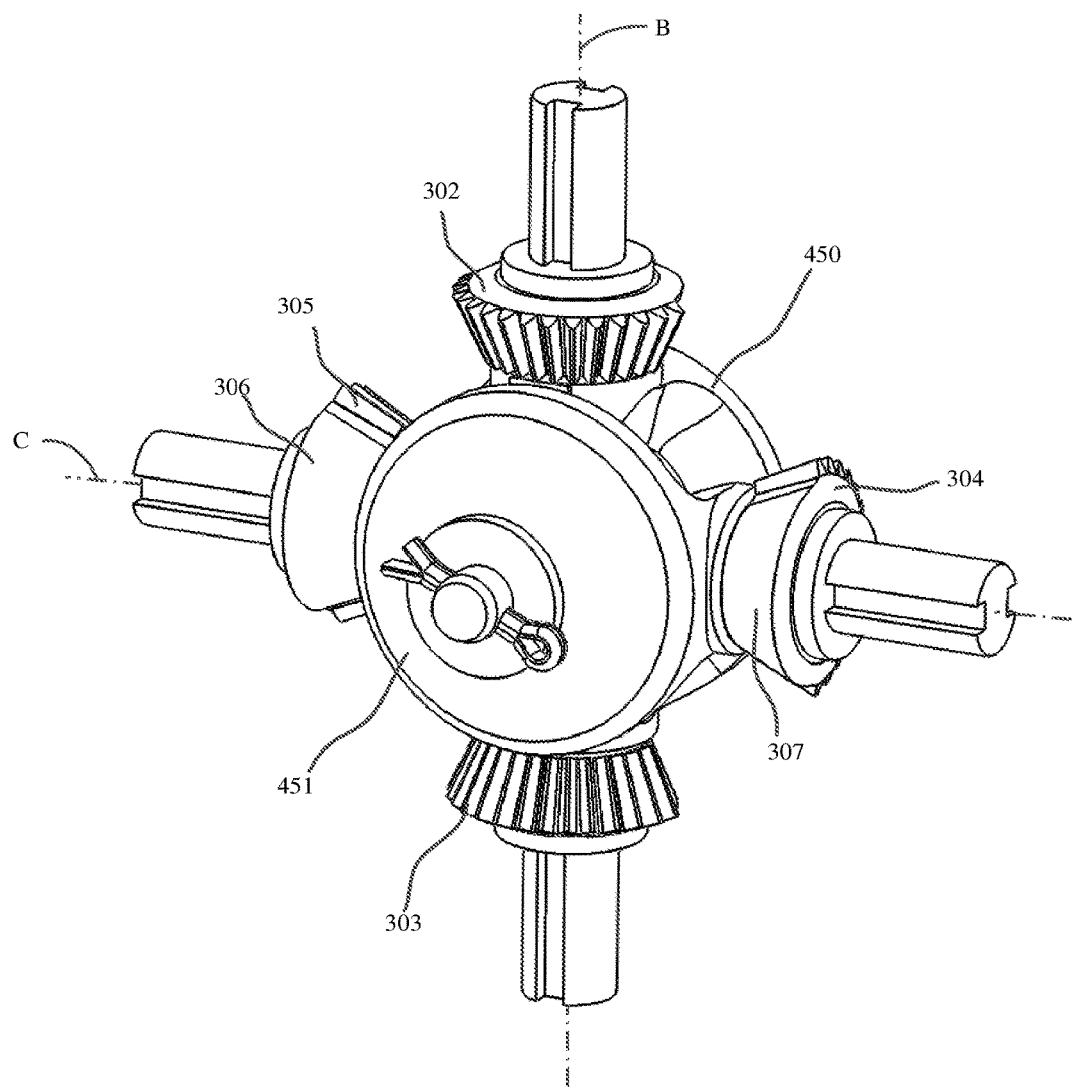
FIG. 9 is a perspective view of gears subassembly (without primary gears)

In FIG. 9, a perspective view of gears subassembly is shown without the primary gears 350, 351. The CV joint assembly 50 is further provided with central connector supports 450, 451 adapted to engage with connecting rods 250, 251, 252, 253 and primary gears 350, 351. The central connector supports 450, 451 are configured to keep the rods and gears secured as a one assembly. In a non-limiting embodiment, the secondary gears have surfaces 306, 307 wherein no gear teeth are provided to prevent the engagement and gears meshing with the primary gear 350, and likewise, same feature applies to secondary gears 302, 303 to the engagement and gears meshing with the primary gear 351.

Figure 10:
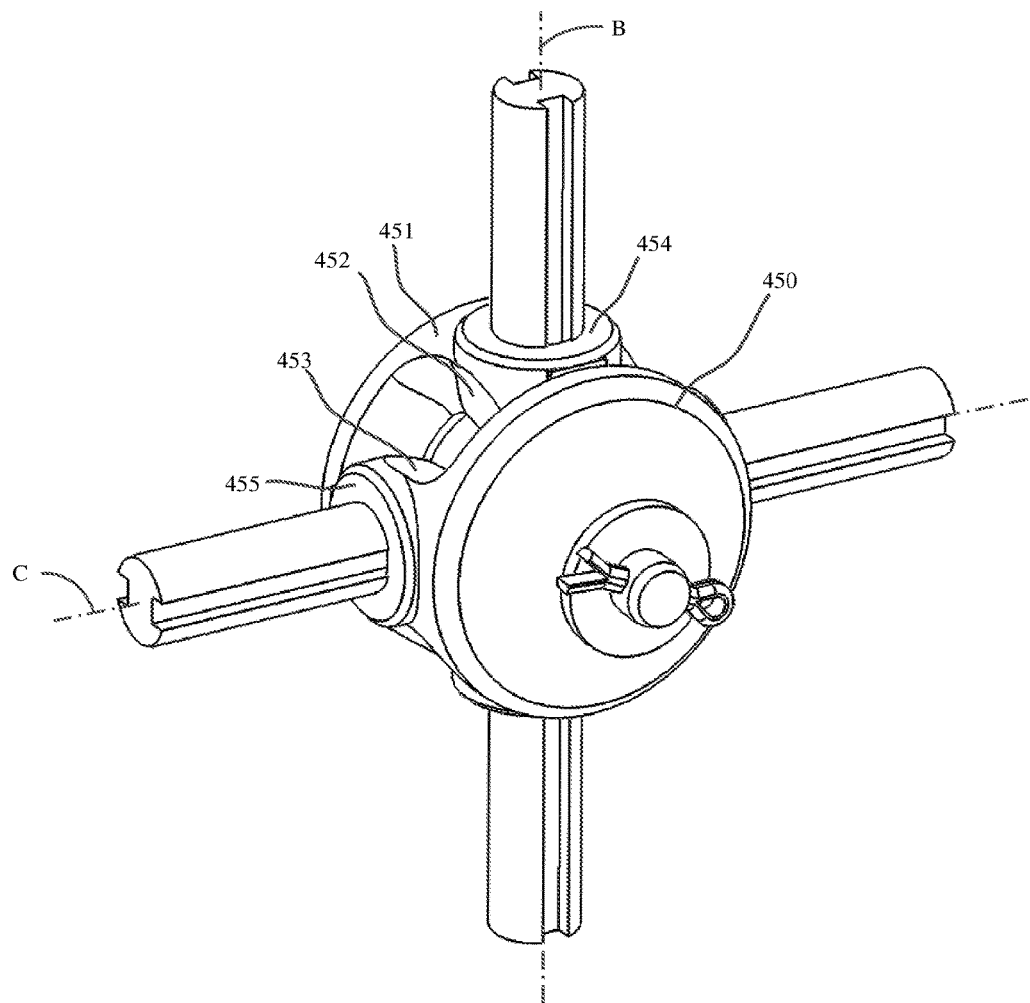
FIG. 10 is a perspective view of connecting rods subassembly (face view)
Figure 11:
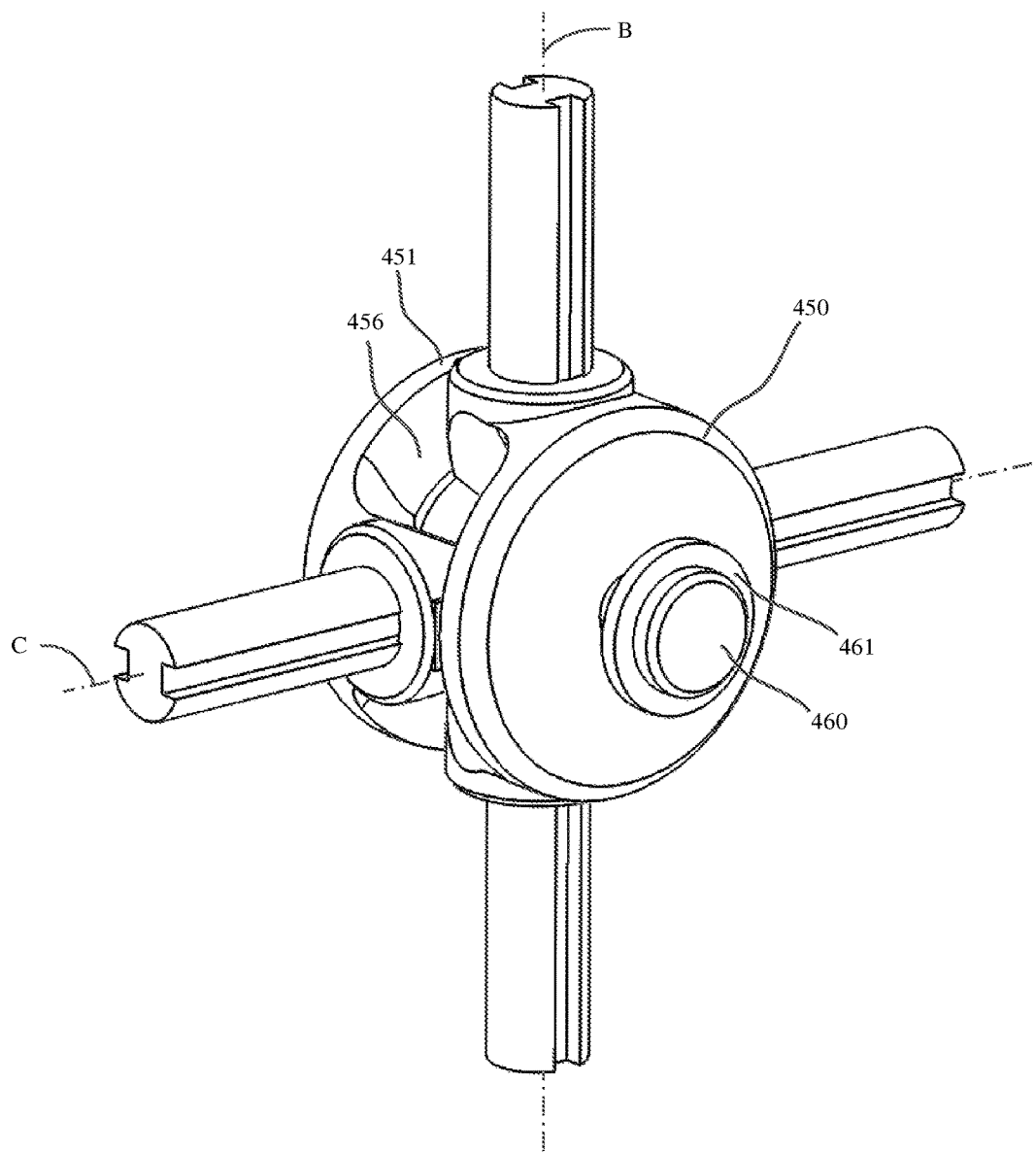
FIG. 11 is a perspective view of connecting rods subassembly (back view)

FIG. 10 is a perspective view of connecting rods subassembly as a face view, while FIG. 11 is a perspective view of connecting rods subassembly as a back view. The assembly 50 is further provided with base surface features 454, 455 of respective members extending from respective central connecting supports 451, 450. These base surfaces, 454, 455 are supporting respective secondary gears allowing them to rotate freely around respective axes B and C. Bearings can be added between the secondary gears and the respective connecting rods to prevent mechanical wear and reduce friction. In a non-limiting embodiment, side surface features 452, 453 provide stop face when angle γ reaches the maximum degree of motion allowed (a combined roll and pitch motion of 155 degree) (See FIG. 4). As shown in FIG. 11, both central connecting supports 451 and 450 include an inner contact surface feature 456 that form a cavity volume, this volume provides the rotational motion allowance. In a non-limiting embodiment, washer 461 is assembled with the central pin 460 against the primary gear 351 and central connecting support 450 (See FIG. 7).

Figure 12:
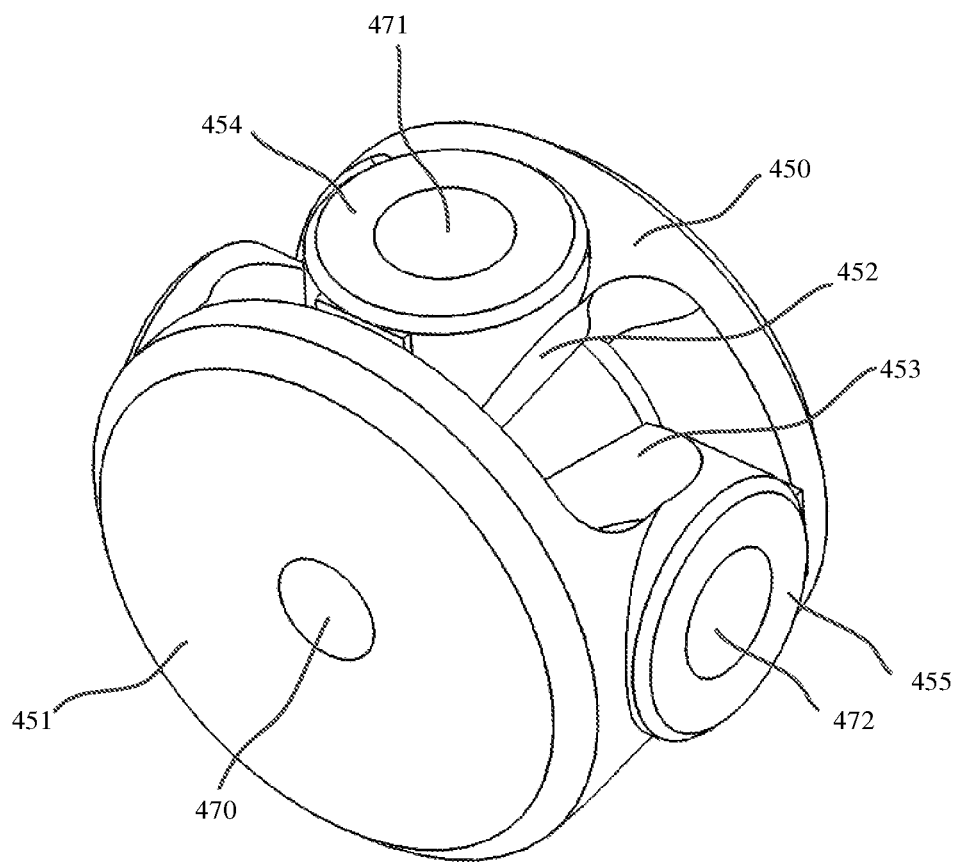
FIG. 12 is a perspective view of connecting support subassembly (without connecting rods)

In FIG. 12, a perspective view of connecting support subassembly is shown without the connecting rods. The central connecter supports 450, 451 include respective openings 471, 472 extending from respective outer surface features 454, 455. In a non-limiting embodiment; respective connecting rods are supported and assembled with openings 471, 472. A clearance fit between connecting rods and openings 471, 472 allow the free rotation of the connecting rods around respective axes B and C (See FIG. 11), in another non-limiting embodiment; a threaded bolts can be used to connect the outer rings to the central connecting supports while penetrating through the connecting rods. Furthermore, the central connecting supports 450, 451 include an opening 470 as depicted in the drawing that works as an assembly housing for the central pin 460 (See FIG. 11)

Figure 13:
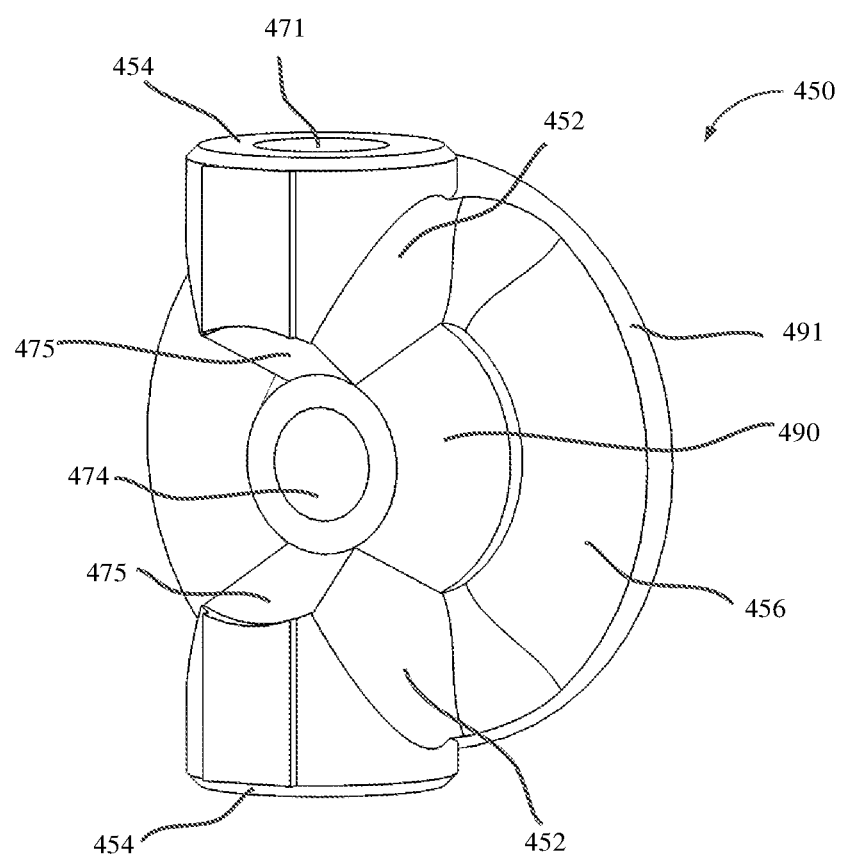
FIG. 13 is a perspective view of a central connecting support.
Figure 14:
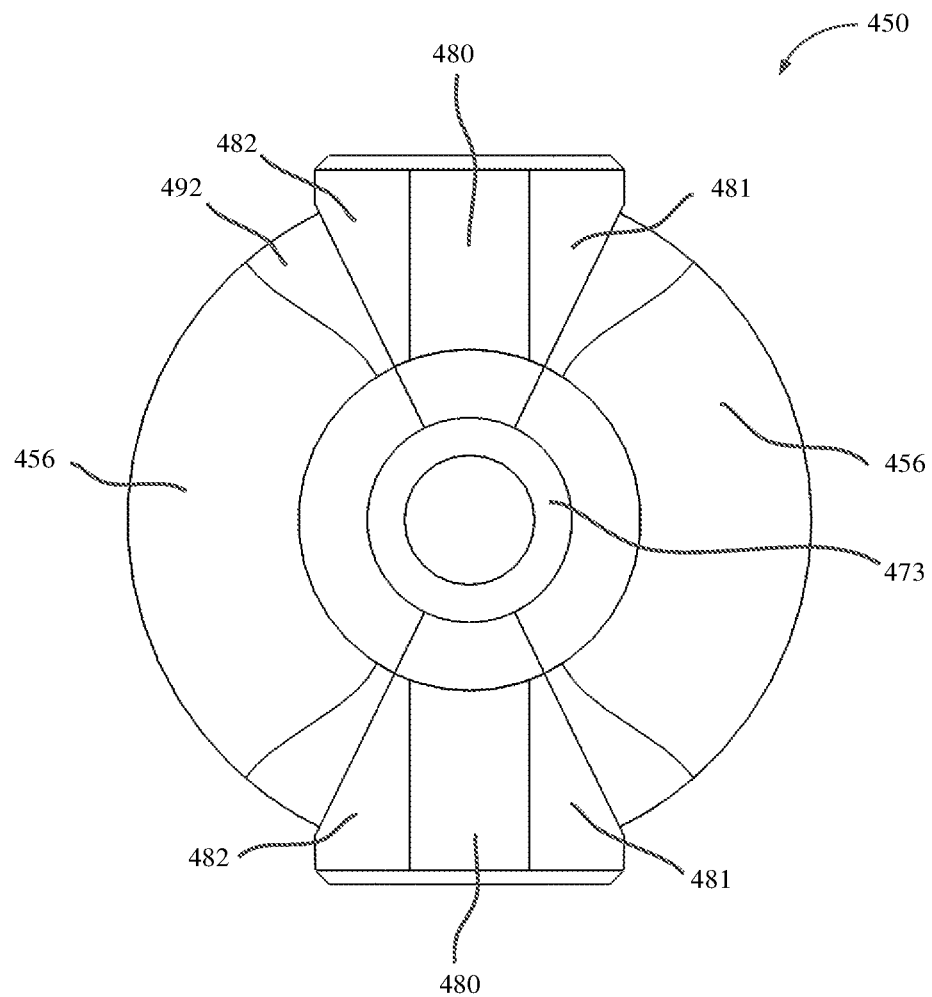
FIG. 14 is a front view of a central connecting support.

FIGS. 13 and 14 are respective perspective and front views of a central connecting support 450. Each member of the central connecting supports 450 and 451 include two members extending from a base surface feature 491 that includes side surface features 452 and surface features 454. In a non-limiting embodiment, the supports 450 and 451 further include an opening feature 474 penetrating through the center of the supports 450 and 451; the central pin 460 is assembled through the opening features 474 and 470. In another non-limiting embodiment, the supports 450 and 451 also have protruding surface features 456 with upraised center surface features 475 and 490, these surface features 452, 456, 490 and 475 forms the contact area between the central connecting support 450 and 451 when assembled together (See FIG. 12). Furthermore, the support 450 and 451 have rim surface features that extend the periphery of base surface feature 491. As shown in FIG. 14, both supports 450 and 451 include surface features 480, 481, 482 along with surface features 492 that are shaped to fit the two supports 450 and 451 when assembled together in a one connecting support subassembly.

Figure 15:
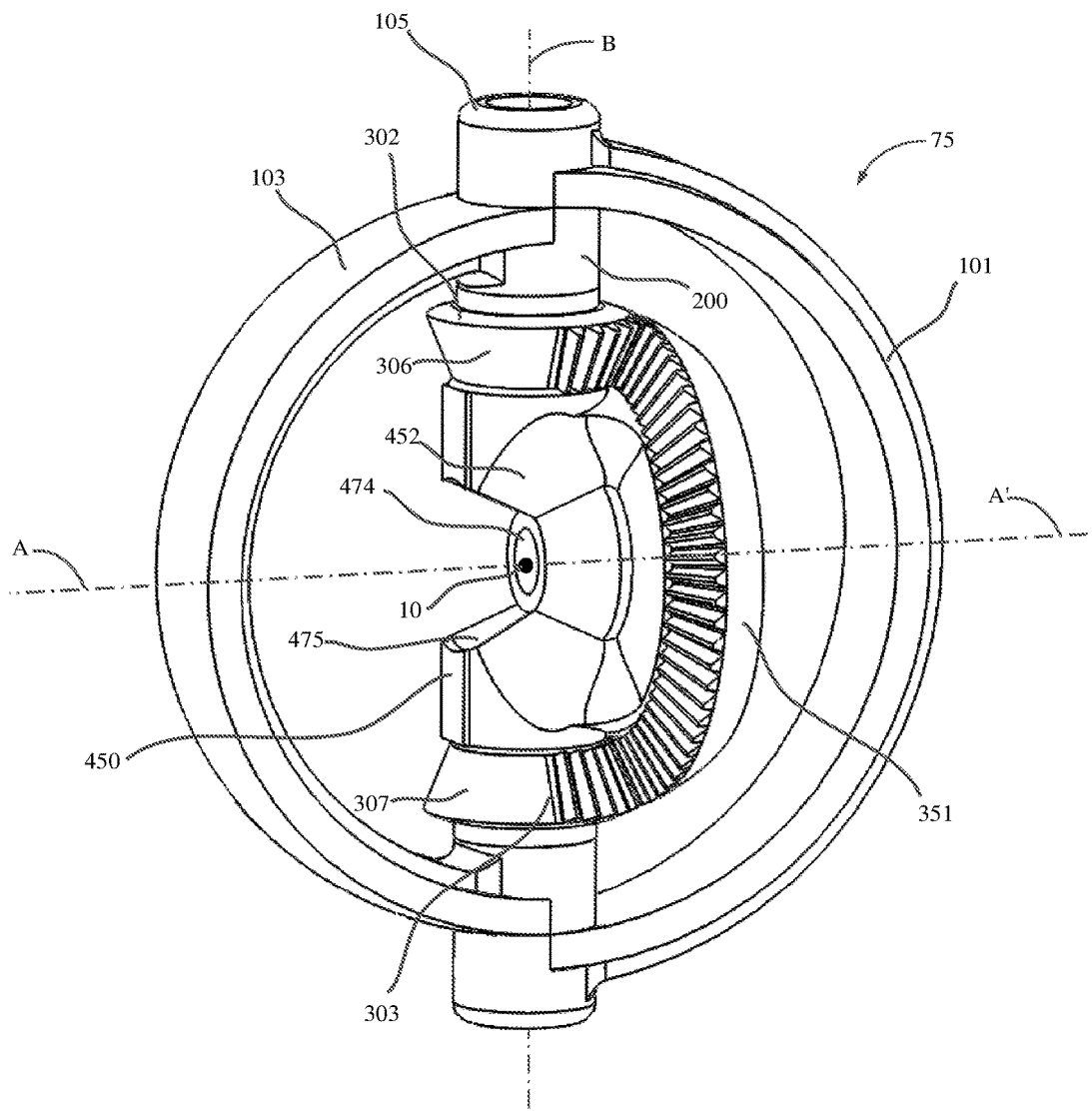
FIG. 15 is a perspective view of a roll subassembly mechanism.
Figure 16:
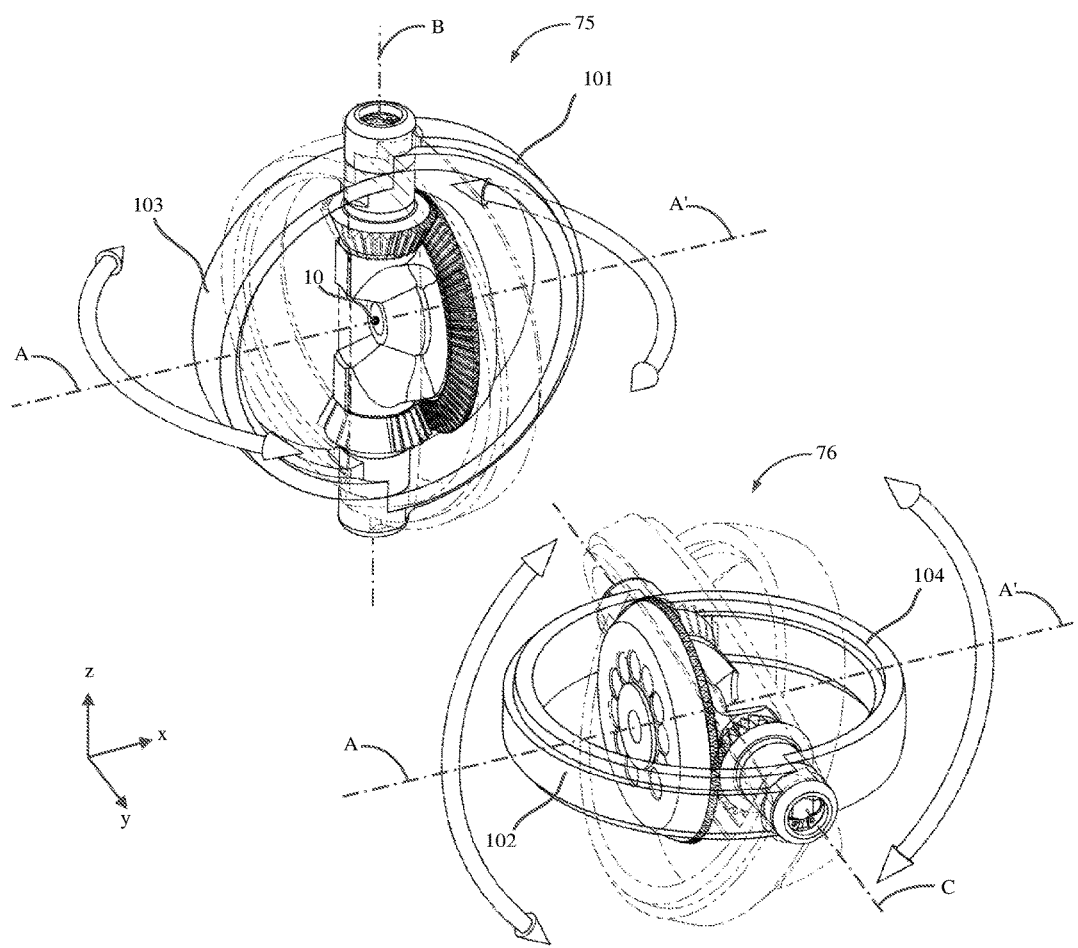
FIG. 16 is perspective views of roll and pitch subassembly mechanisms with full range of motion.

FIG. 15 is a perspective view of a roll subassembly mechanism 75 utilizing the features discussed above, while FIG. 16 is perspective views of roll and pitch subassembly mechanisms and full range of motion utilizing the features discussed above. As shown of FIG. 16, outer ring 101 connected to the inner ring 103 through the internal gears. These gears governs the two rings 101, 103 to rotate respectively to each other around axis B while keeping the central connecting support centered in the middle of this motion, likewise, the same concept applies on subassembly 76 where gears governs the outer ring 102 and inner ring 104 to rotate respectively to each other around axis C in respective motion to each other, while keeping the central connecting support centered in the middle of this motion. These both subassembly mechanisms 75 and 76 are assembled and combined with each other using central pin 317 (See FIG. 8). In a non-limiting embodiment, the roll and pitch motions can move independently of each other but can still simultaneously move together enabling CV joint assembly 50 to achieve a full range of γ angle as shown on FIG. 4.

Figure 17:
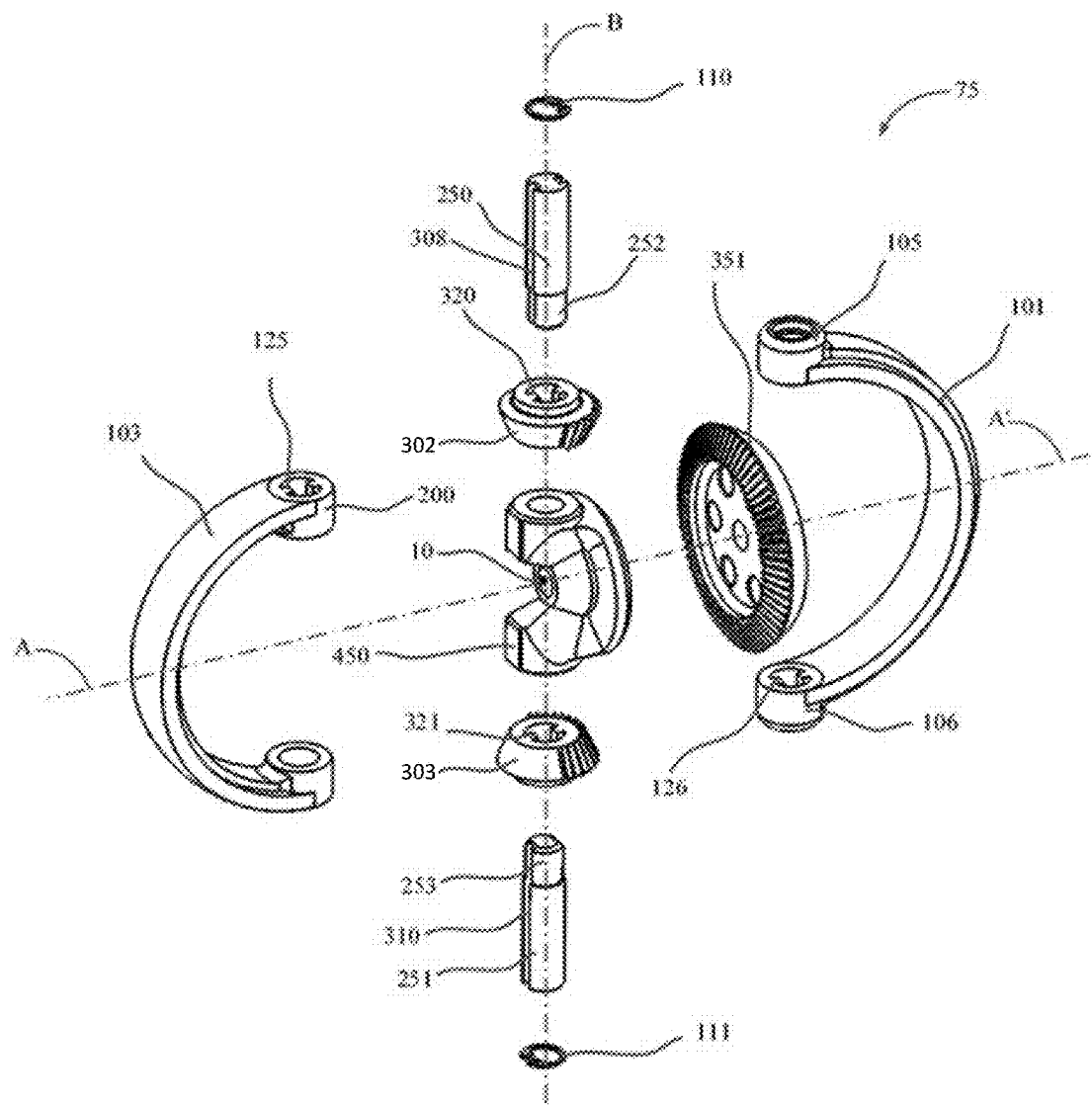
FIG. 17 is an exploded view of a roll subassembly mechanism.

FIG. 17 is an exploded view of a roll subassembly mechanism. As shown, a key feature 126 on outer ring 101 connects the outer ring to the secondary gear 303 from the lower outer housing 106; likewise, a key feature 125 on inner ring 103 connects the inner ring 103 to the secondary gear 302 from the upper outer housing 105. The outer ring 101 is attached to the secondary gear 307 using key feature 310 on rod 251 through key feature 126, rod 253 and key features 321 on secondary gear 303. In the same way, the inner ring 103 is attached to the secondary gear 302 using key feature 308 on rod 250 through key feature 125, rod 252 and key features 320 on secondary gear 302. In a non-limiting embodiment, primary gear 351 will govern and control the rotation of the secondary gears 302 and 303 in opposite directions around axis B. Rods 250 and 251 have surfaces 252, 253 that fit inside the central connecting support and allow the rods to rotate freely inside hole features 471. In a non-limiting embodiment; rods 250 and 251 can be assembled with holes feature 471 using bearings that allow the rotation motion inside hole features 471 around axis B. The subassembly 75 is further provided with internal C-Clips 110, 111 to hold rods 250, 251 in place through the outer ring 101 upper and lower housing features 105 and 106.

Figure 18:
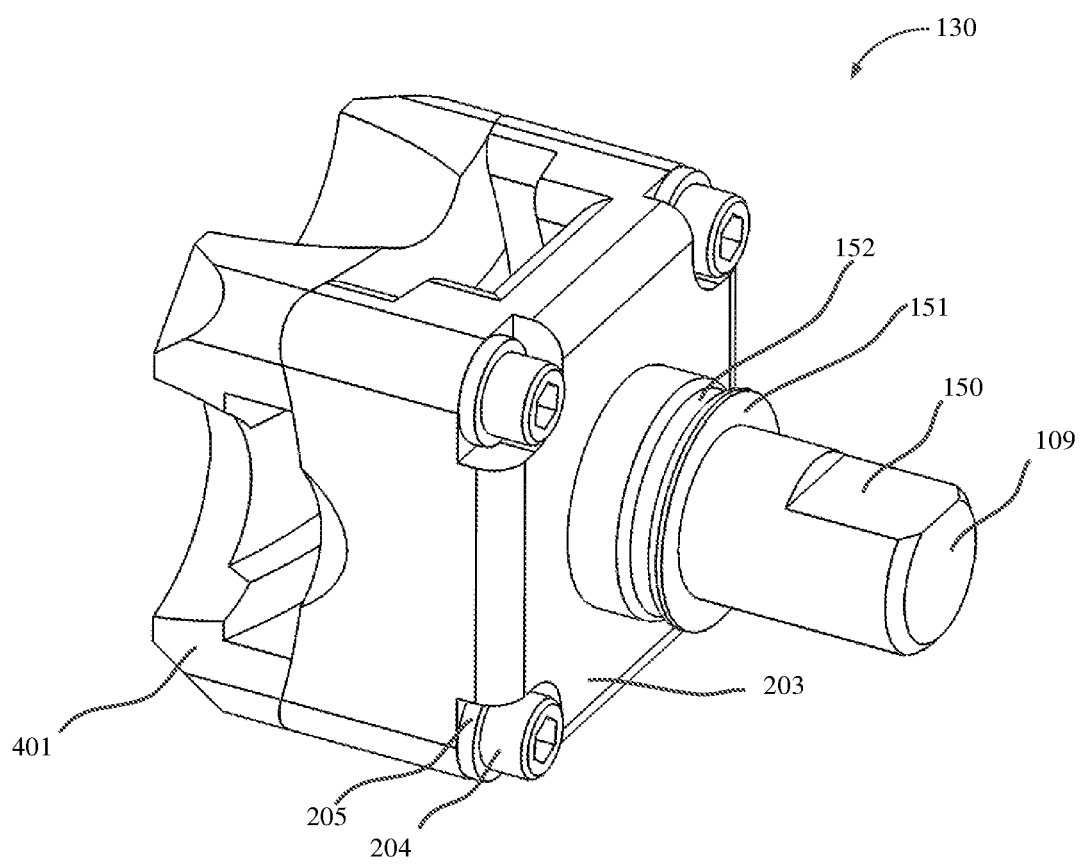
FIG. 18 is a perspective view of a sliding support subassembly.

In FIG. 18 a perspective view of the sliding support subassembly 130 is shown. The subassembly 130 is further provided with threaded fasteners 204 that engage with relative washers 205 and secure the sliding support 401 to the sliding support 203. In a non-limiting embodiment; the sliding support subassembly 130 includes a coupling shaft end 109 with a cutout future 150, the coupling shaft end 109 is connected to an outer source of rotational motion around Axis A-A' through an input shaft. In a non-limiting embodiment; a secondary surface feature 151 forms a groove feature 152. Oil shroud container sections 550, 552 are assembled through tension rings 554, 556 on the groove feature 152 (See FIG. 22).

Figure 19:
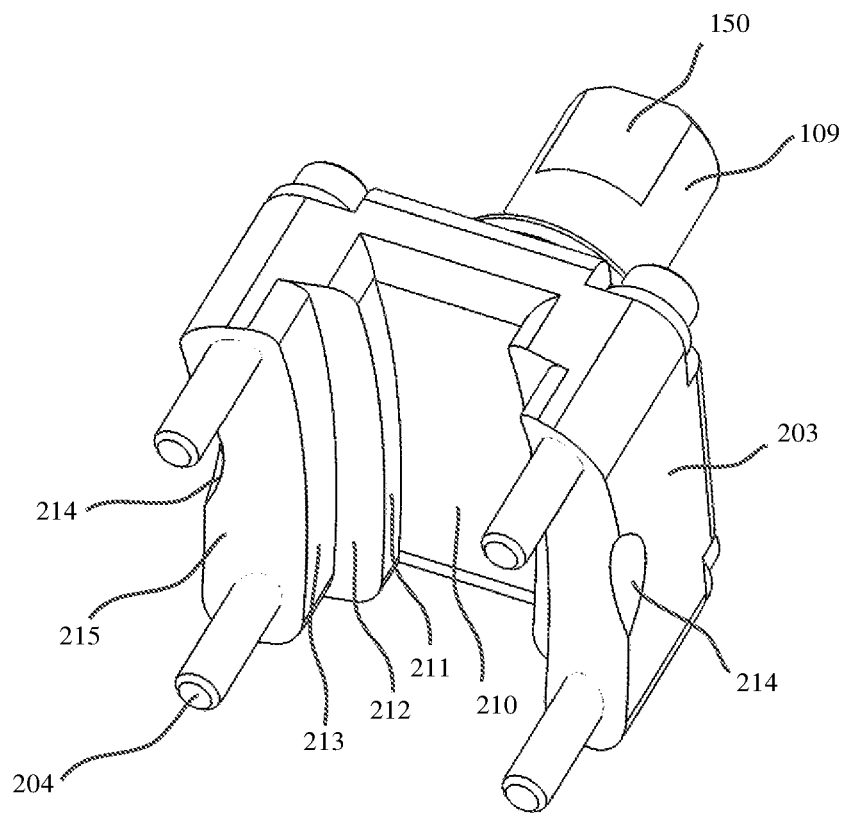
FIG. 19 is a perspective view of an upper sliding support.

In FIG. 19, the sliding support 203 includes a lower surface 210 with side features 211 that engage with offset surface features 212 and 213. These surface features are designed to fit, engage with the outer rings 101, 102 and to allow a relative sliding motion between the parts (See FIG. 2). In a non-limiting embodiment, bearings or rollers can be added between the outer rings 101, 102 and sliding surface features 211, 212 and 213 to reduce mechanical friction and wear. The sides of the sliding support 203 form two indentation features 214 extend to a lower surface 215. These cutout indentation features 214 will give wider angular range of relative motion for both angles α and β (See FIGS. 3A, 3B).

Figure 20:
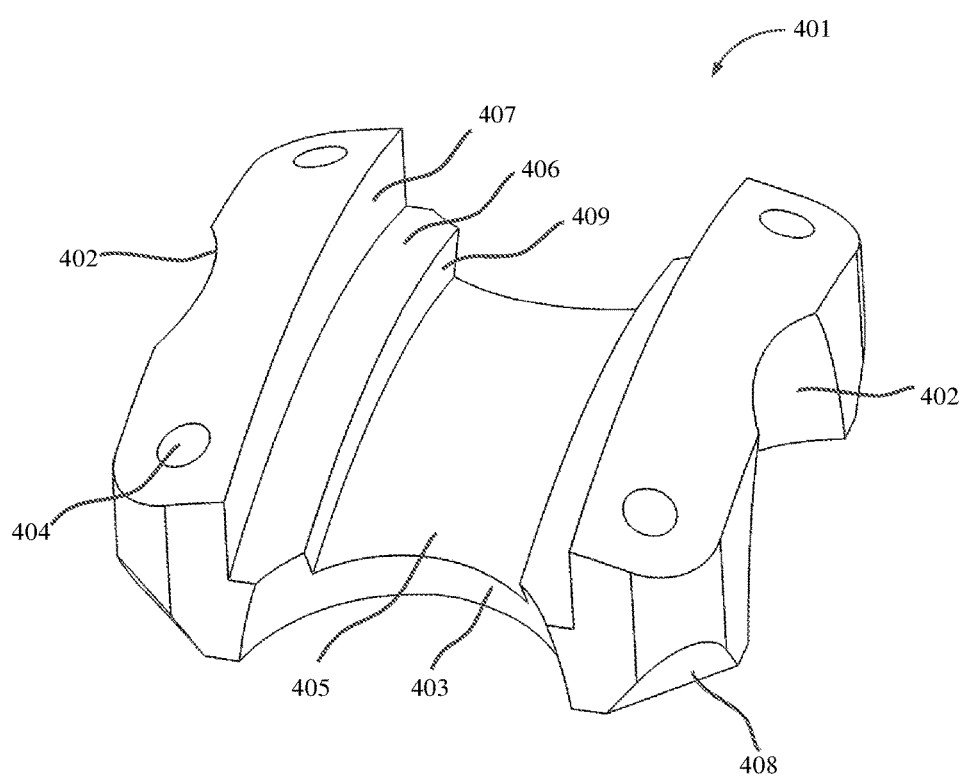
FIG. 20 is a perspective view of a lower sliding support.

In FIG. 20, the sliding support 401 is shown having surface features 405, 409, 406 and 407. These surface features are designed to fit, engage with the inner rings 103, 104 and to allow a relative sliding motion between the parts (See FIG. 2). In a non-limiting embodiment, bearings or rollers can be added between the inner rings 103, 104 and sliding surfaces 405, 409, 406 and 407 and to reduce mechanical friction and wear. Furthermore, cutout indentation features 402, 403 and 408 extend inwardly on the side surfaces of sliding support 401. These cutout indentation features will give wider operating range of motion for angles α and β (See FIG. 3A, 3B). The sliding support 401 is further provided with a plurality of threaded holes 404 that engage with the fasteners 204.

Figure 21:
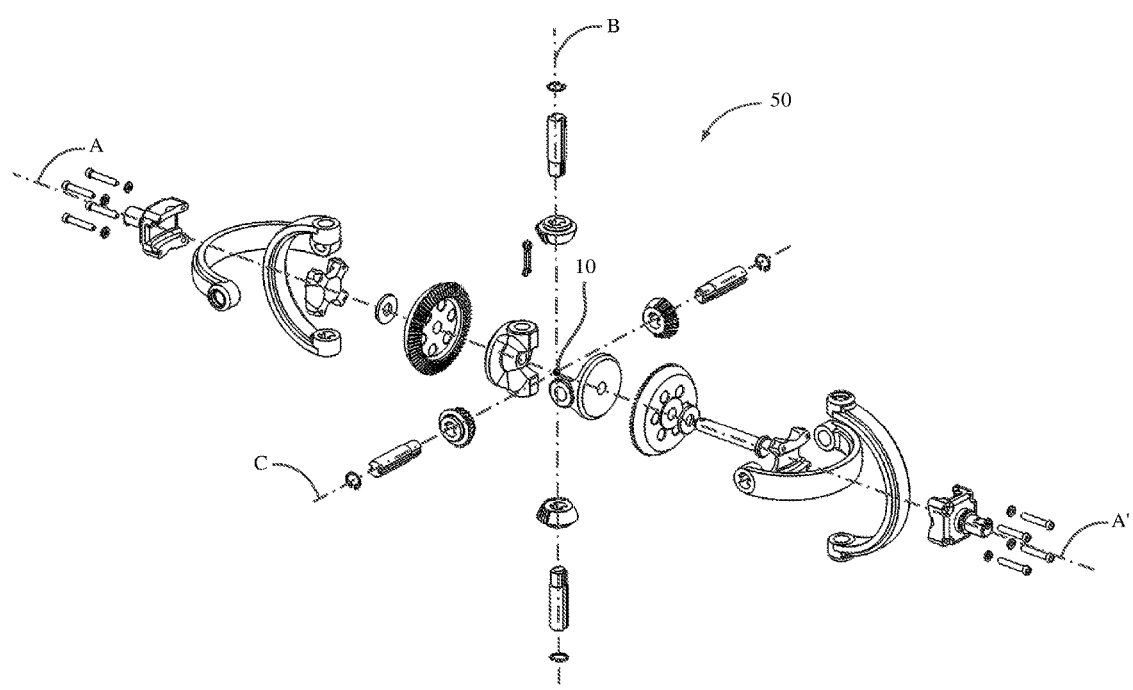
FIG. 21 is an exploded view of a CV joint assembly.

In FIG. 21, an exploded view of a CV joint assembly 50 is shown with all components, geometric center of the CV joint 10 and the three axes A-A', B and C.

Figure 22:
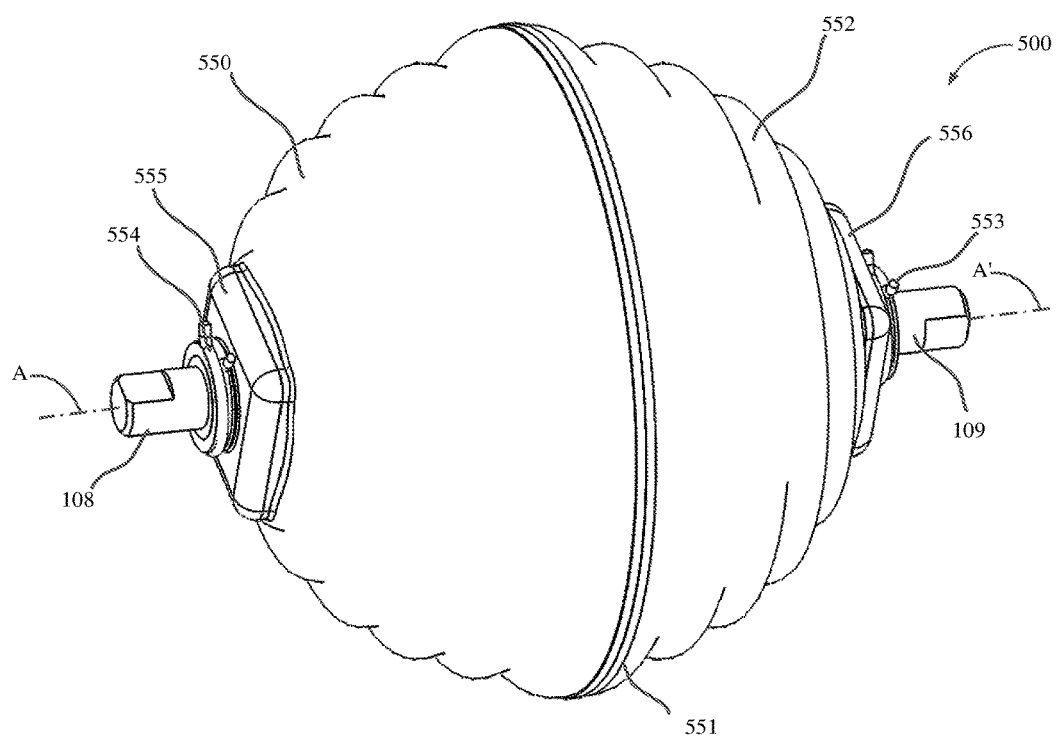
FIG. 22 is a perspective view of a CV joint assembly with oil shroud container.
Figure 23:
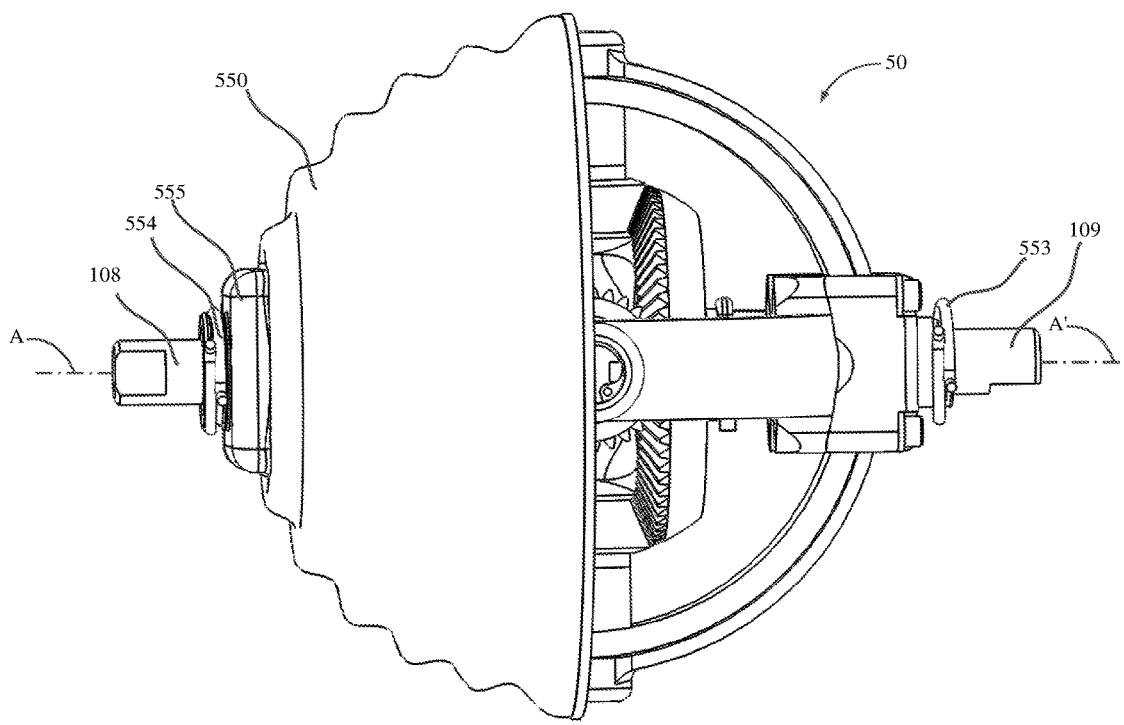
FIG. 23 is the front view of a CV joint assembly with partial oil shroud container.

FIGS. 22 and 23 are respective perspective and front views of a CV joint assembly 50 with oil shroud container 500 having a first oil shroud section 550 and a second section 552 configured to contain and store lubricant fluid or grease utilized by assembly 50. In a non-limiting embodiment, a seam feature 551 is used to assemble sections 550 and 552 together. Surface features 555, 556 are secured in location against respective coupling shafts groove features 151 and 152 via respective tension rings 554, 553 (See FIG. 18).

Figure 24:
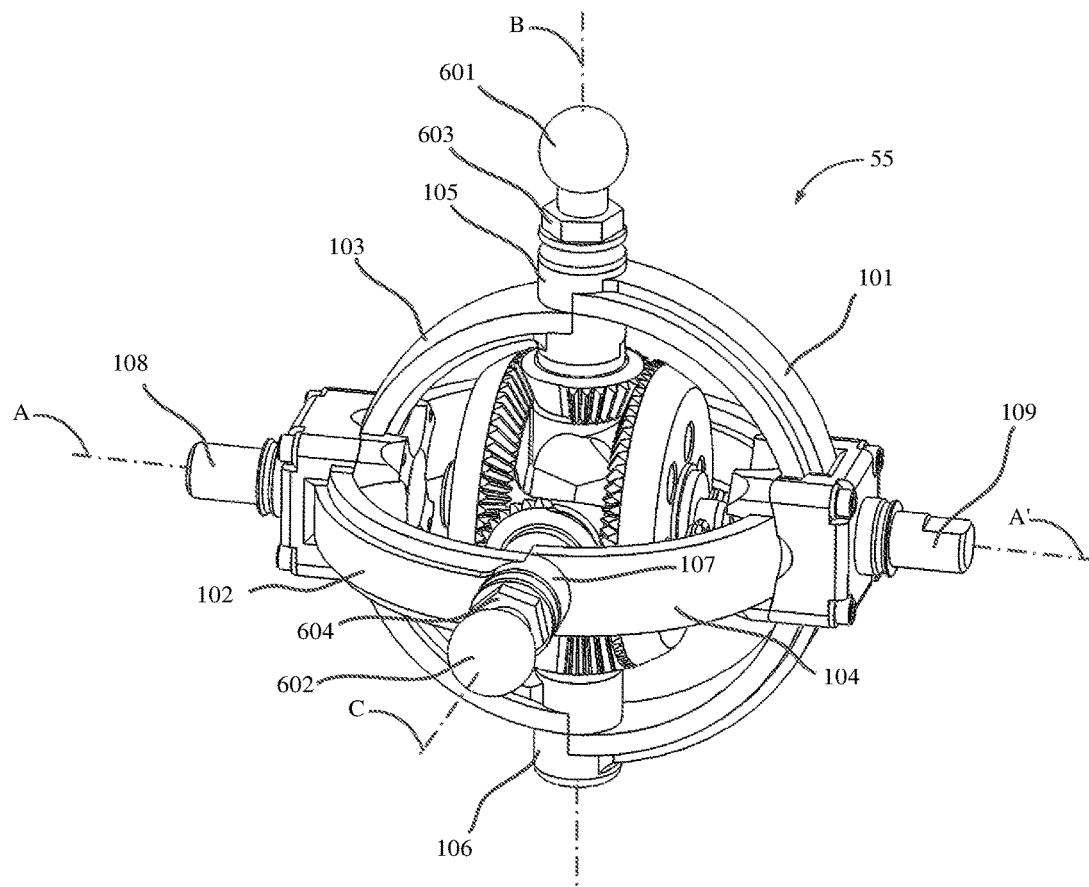
FIG. 24 is a perspective view of a robotic joint assembly.

In FIG. 24 a perspective view of a robotic joint assembly 55 is shown utilizing the features of assembly 50. However, in this embodiment, the assembly 55 includes nobs 601, 602 to replace rods 250, 252 (See FIG. 8). These nobs allow the receiving of additional linkages or connections to outer mechanisms.

Figure 25:
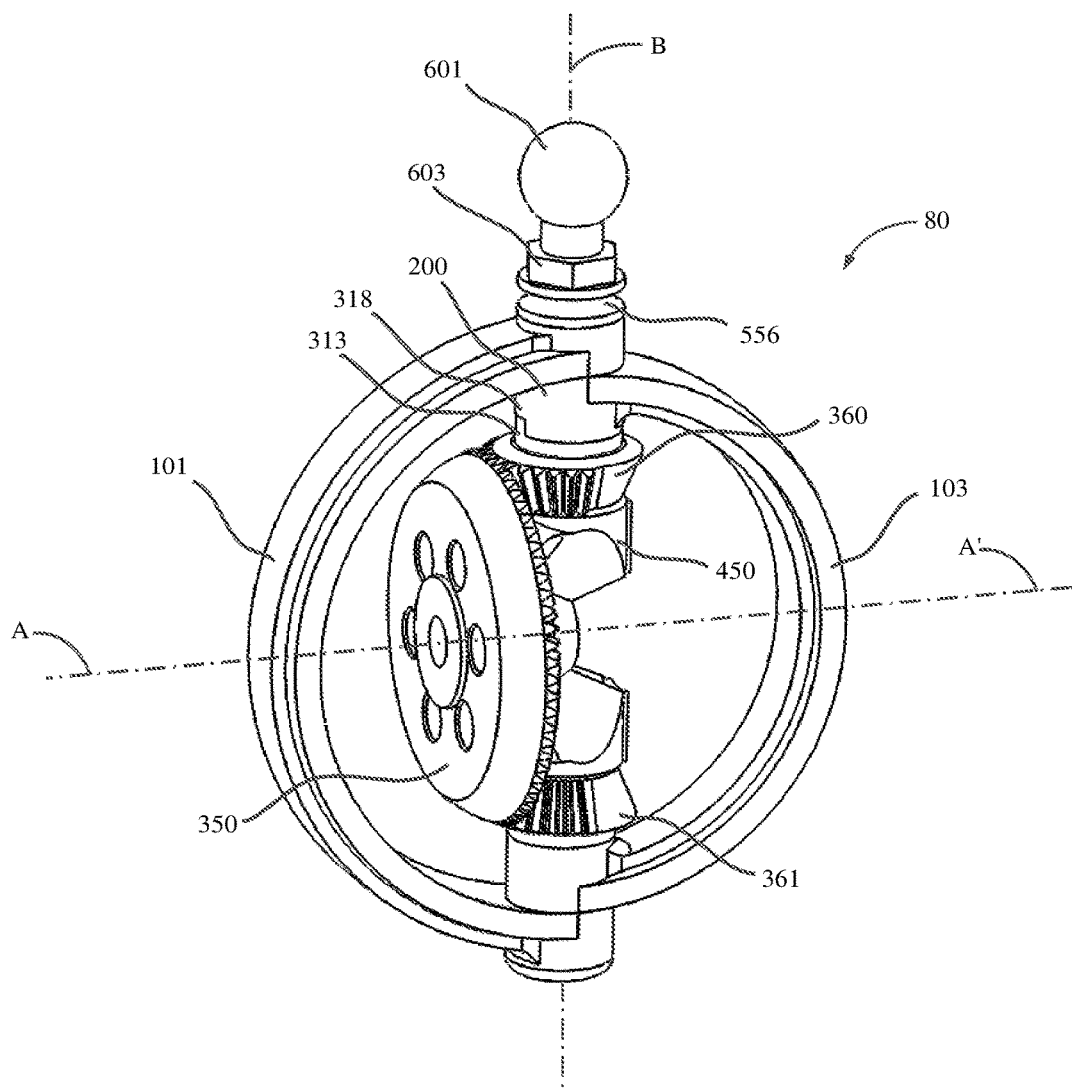
FIG. 25 is a perspective view of a robotic joint roll subassembly mechanism.

FIG. 25 is a perspective view of a roll subassembly mechanism of the robotic joint 80. In a non-limiting embodiment, inner ring 103 has an upper housing 200 with additional housing feature 318 serves as a cutout key. The secondary gear 360 has a key feature 313 that assembles with feature 318 and enables the mechanical connection between the secondary gear 360 and the inner ring 103.

Figure 26:
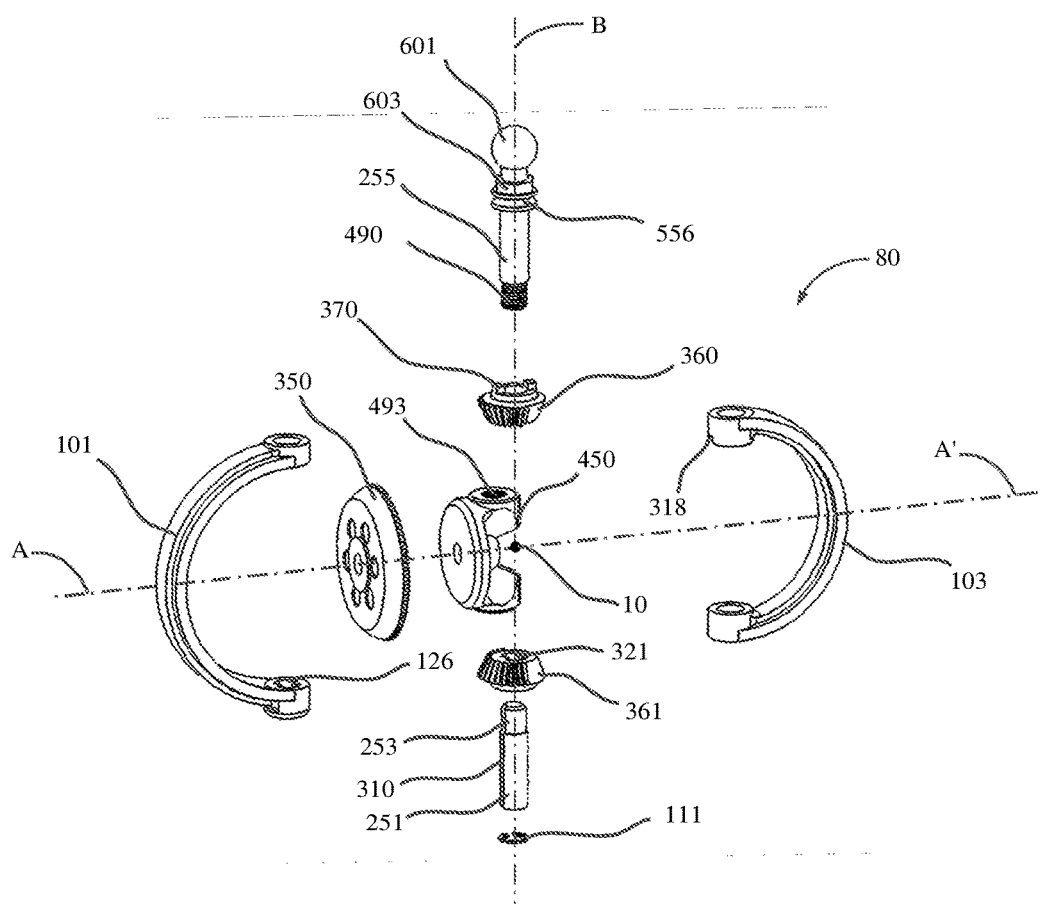
FIG. 26 is an exploded view of a roll subassembly mechanism for a robotic joint.

FIG. 26 is an exploded view of a roll subassembly mechanism of the robotic joint. In a non-limiting embodiment, the nob 601 has integrated with fastener feature 603. The fastener feature 603 is assembled to the central connecting support 450 throw a thread screw feature 490 and threaded hole feature 493. Furthermore, oil shroud sections 570 and 571 are assembled to a groove feature 556 by a tension ring (See FIG. 28).

Figure 27:
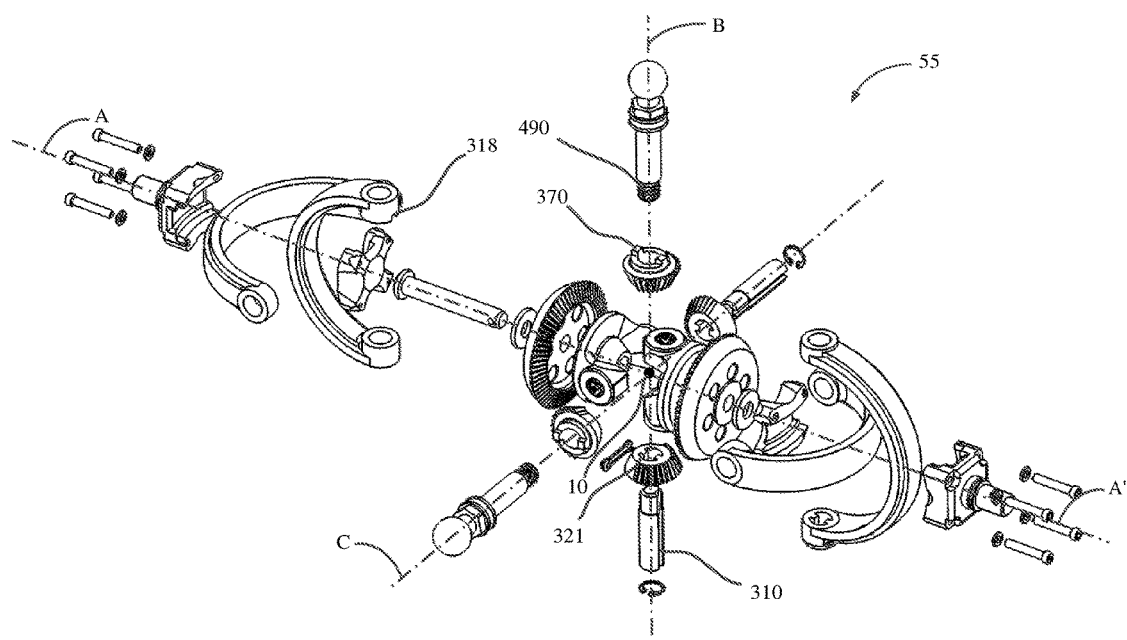
FIG. 27 is an exploded view of a robotic joint assembly.

In FIG. 27, an exploded view of a robotic joint assembly 55 is shown with all components, geometric center of the robotic joint assembly joint 10 and the three axes A-A', B and C.

Figure 28:
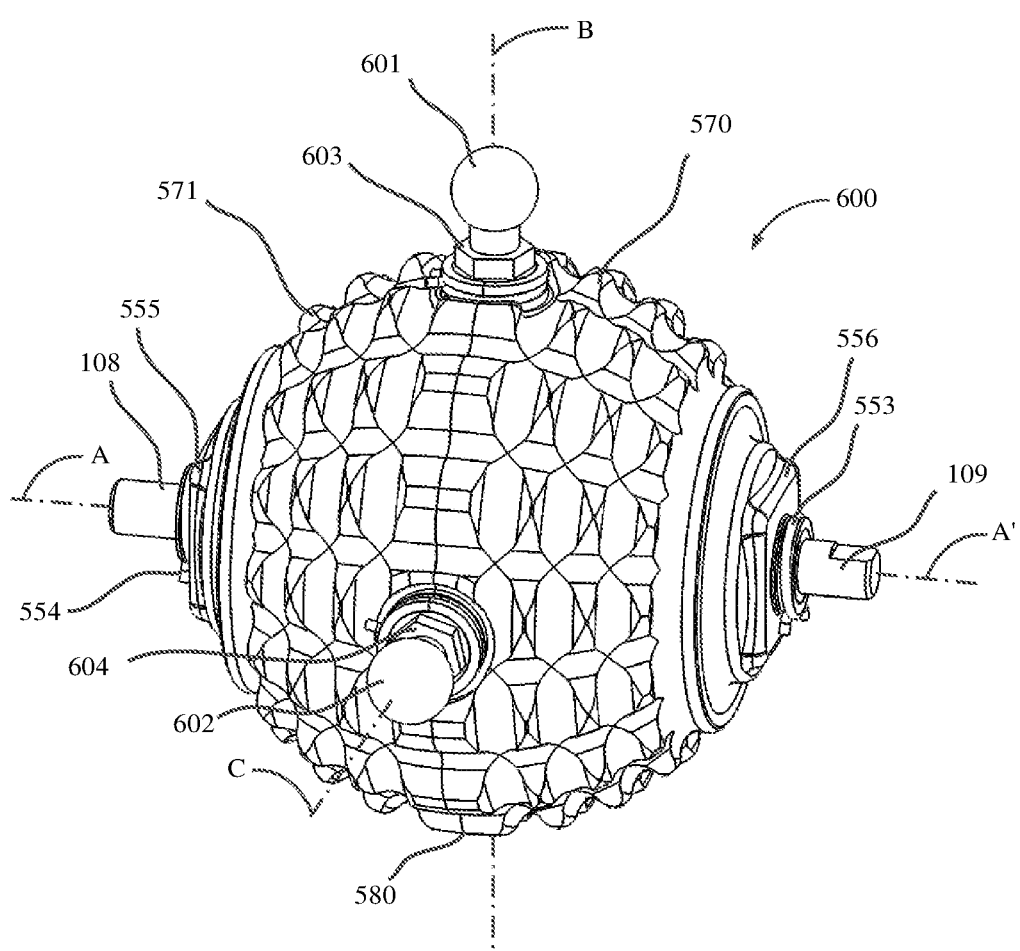
FIG. 28 is a perspective view of a robotic joint assembly with oil shroud container.
Figure 29:
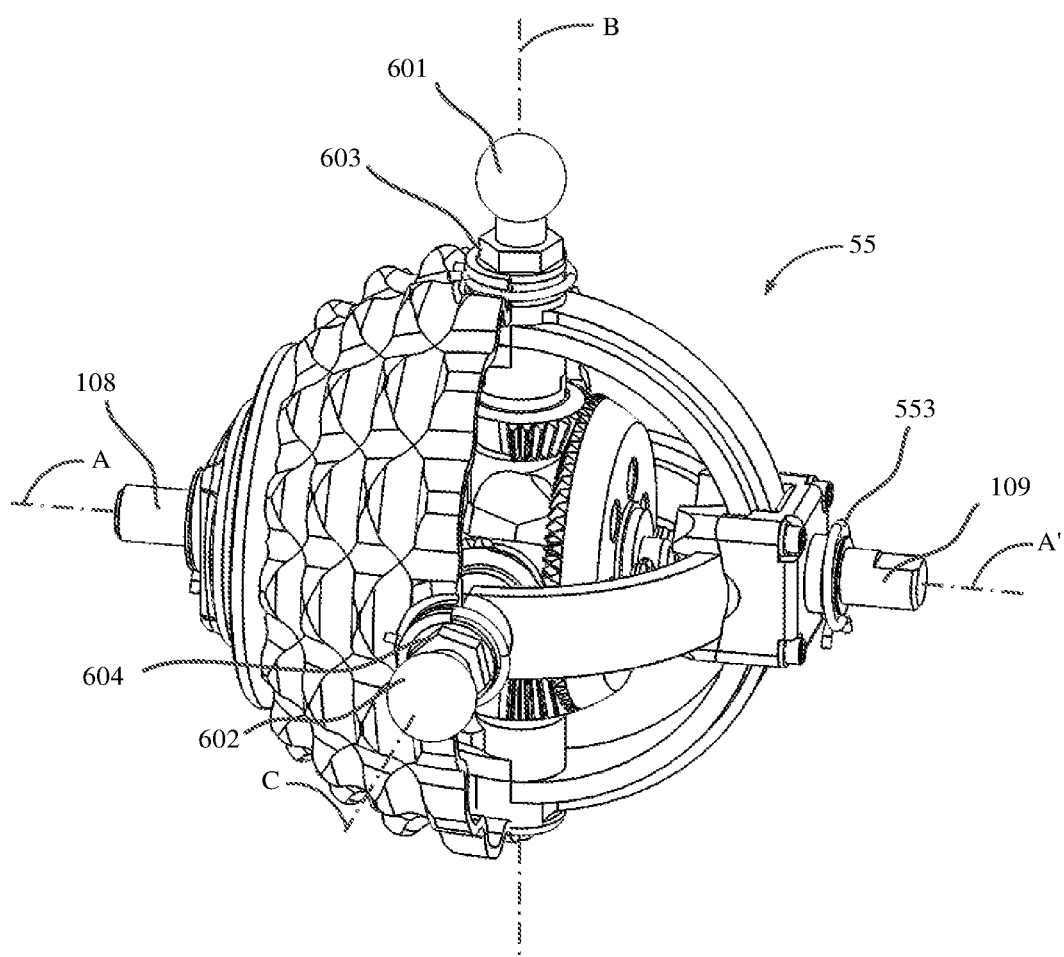
FIG. 29 is another perspective view of a robotic joint assembly with partial oil shroud container.

FIGS. 28 and 29 are perspective views of the robotic joint assembly 55 mentioned above and utilized with an alternative embodiment of the oil shroud sections 570 and 571. In this embodiment, the oil shroud container 600 is made of two oil shroud sections 570 and 571 assembled by a seam feature 580. The oil shroud container 600 is configured to allow nobs 601, 602 with fasteners 603, 604 to penetrate through the shroud container 600 without leaking oil. In this embodiment, the oil shroud sections 570, 571 are contoured to allow better range of motion in both pitch and roll directions.

Figure 30:
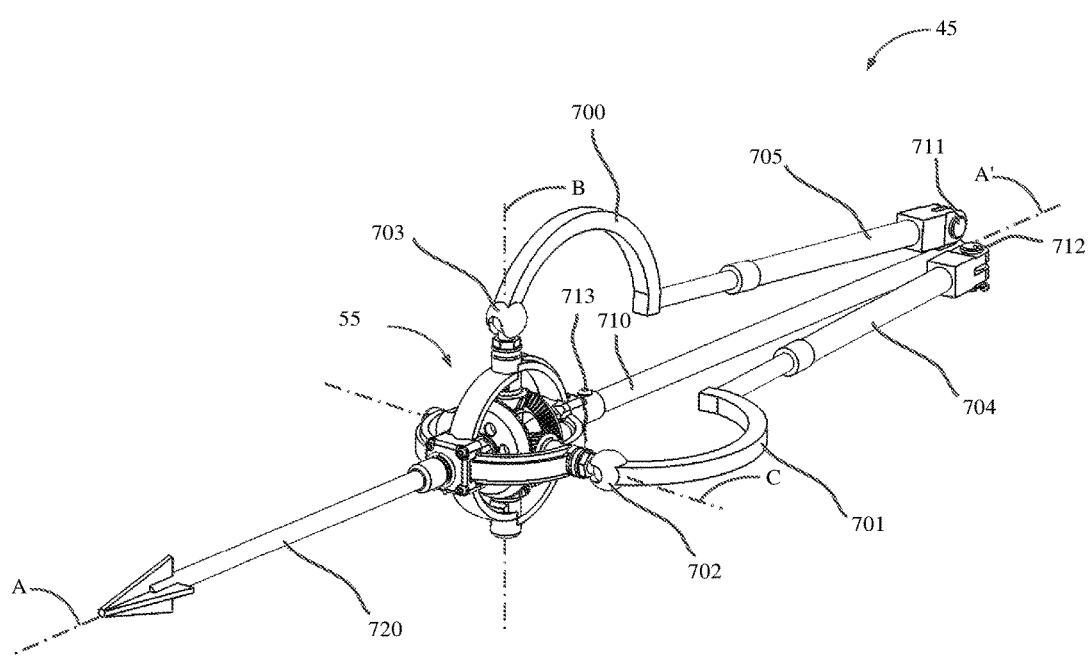
FIG. 30 is a perspective view of a robotic joint assembly with hydraulic arms.

In FIG. 30, hydraulic arms 700, 701 are connected to nobs 601, 602 with spherical housings 703, 702. In a non-limiting embodiment, a rotational motion is allowed between the nobs 601, 602 and the spherical housings 703, 702. A mount arm 710 is added to hold the robotic assembly 55 and is secured in place by a bolt 713. Piston actuators 705, 704 are secured from one end to the mount arm 710 using pins 711, 712 and to the spherical housings 703, 702 from the other end. A moving arm 720 is secured to the assembly 55 through the connecting sliding support. The hydraulic arm 700 is designed to linearly move on the A-A'/B plane, while the hydraulic arm 701 is designed to linearly move on the A-A'/C plane. The linear movements of the hydraulic arms 700 and 701 are independent of each other, and are not restricting to the full pitch and roll motion range of the assembly 55 mentioned earlier. In a non-limiting, embodiment the full pitch range is 155 degree and the and roll motion range is 155 degree, the roll and pitch motion are independent of each other but can still simultaneously move together to a full range of γ angle as shown on FIG. 4. The movement of arm 720 is governed by the linear movements of the hydraulic arms 700 and 701 in addition to the pitch and roll motion of the assembly 55. Furthermore, a coupling shaft end 109 can be connected to the mount arm 710, the coupling shaft end 109 is also connected to an outer source of rotational motion around Axis A-A' through an input shaft.

Figure 31:
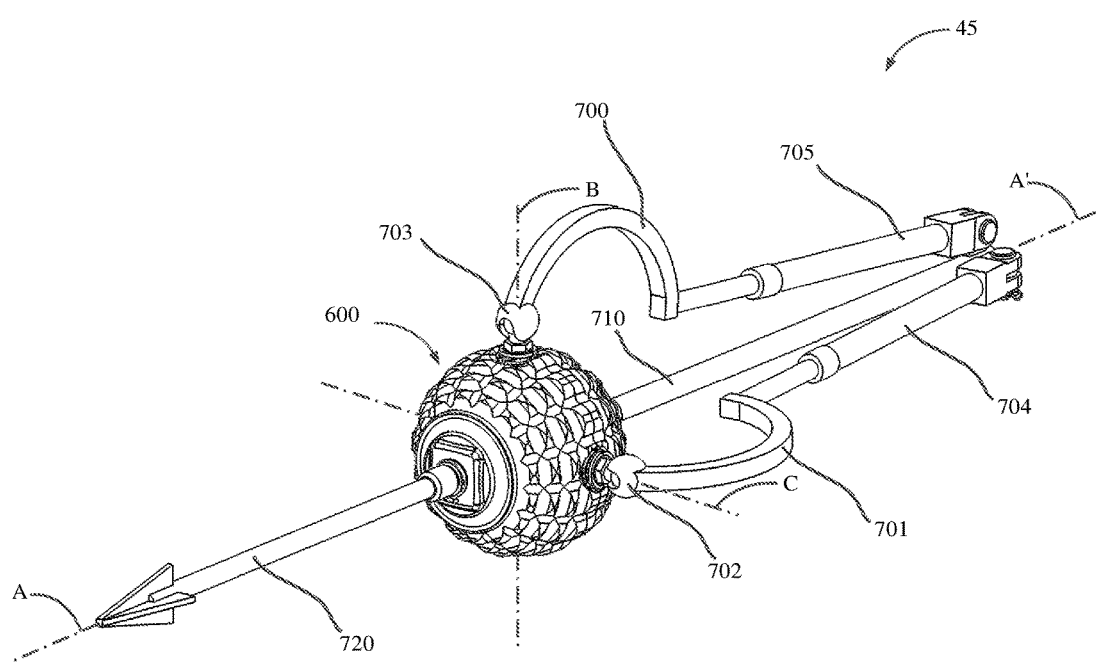
FIG. 31 is a perspective view of robotic joint assembly with hydraulic arms and oil shroud container.
Figure 32:
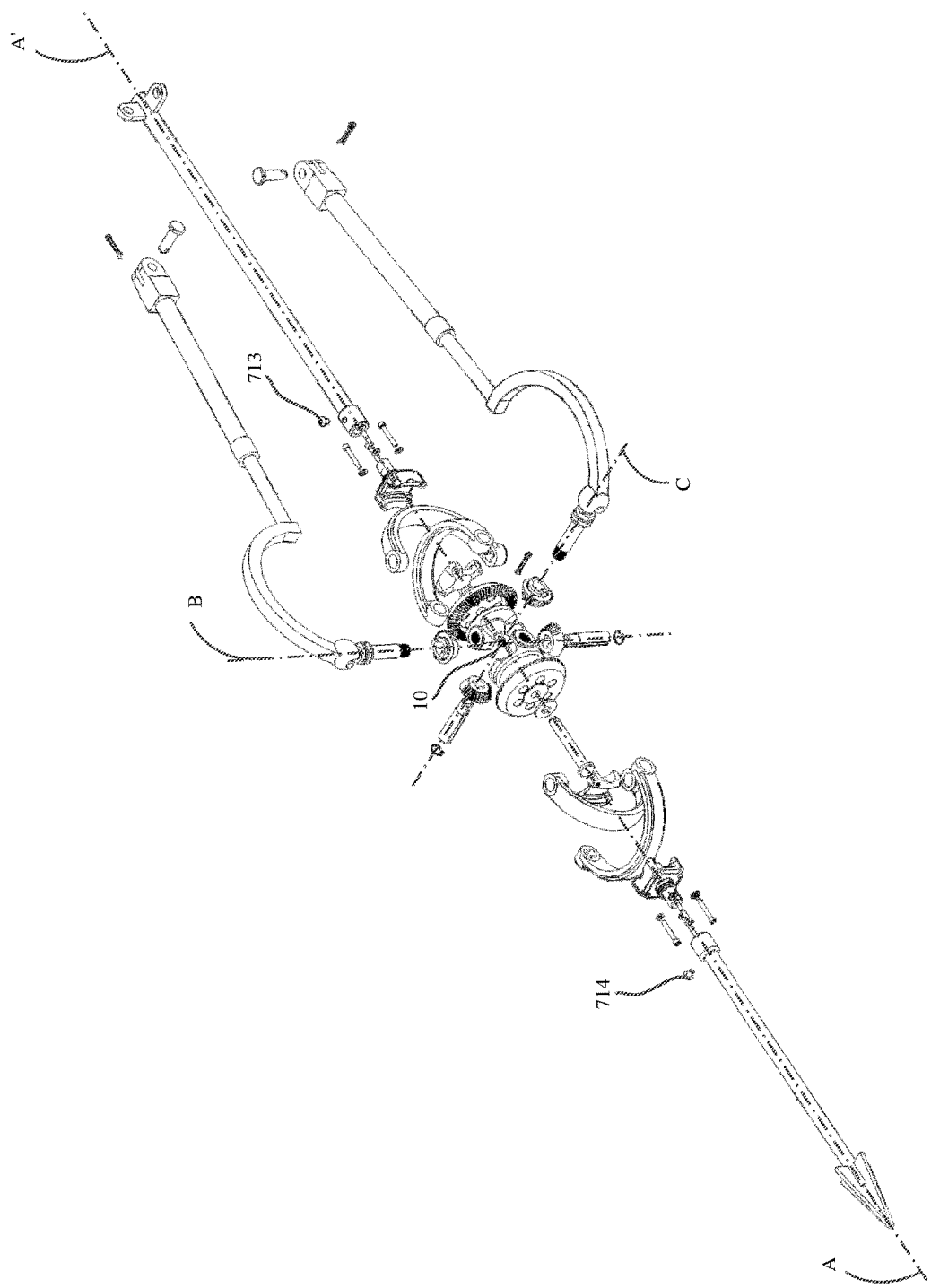
FIG. 32 is an exploded view of a robotic joint assembly with hydraulic arms.

In FIGS. 31 and 32, an assembled and an exploded view of a robotic joint assembly 45 are shown with all components, geometric center 10 of the robotic joint assembly joint 10 and the three axes A-A', B and C.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A constant velocity (CV) joint system, comprising:
   a CV joint assembly, having:
   a rings system comprising:
   a first elongated ring pivotally attached to a second elongated ring via a first rotating housing and a second rotating housing, the first rotating housing and the second rotating housing being configured to rotate along a first axis;
   a third elongated ring pivotally attached to a fourth elongated ring via a third rotating housing and a fourth rotating housing, the third rotating housing and the fourth rotating housing being configured to rotate along a second axis;
   a first sliding support subassembly having:
   a first upper sliding support:
   a first lower sliding support,
   the first lower sliding support extending in a direction perpendicular to the first upper sliding support;
   wherein the first upper sliding support is configured to slidingly receive the first elongated ring; and
   wherein the first lower sliding support is configured to slidingly receive the third elongated ring; and
   a second sliding support subassembly having:
   a second upper sliding support:
   a second lower sliding support,
   extending in a direction perpendicular to the second upper sliding support;
   wherein the second upper sliding support is configured to slidingly receive the second elongated ring;
   wherein the second lower sliding support is configured to slidingly receive the fourth elongated ring;
   a primary gears system carried by the rings system and having a first and second primary gear, and
   a central connecting support assembly:
   wherein the first primary gear and the second primary gear are rotatably attached to the central connecting support.

2. The system of claim 1, further comprising:
   a secondary gears system having:
   a first secondary gear secured to the first housing;
   a second secondary gear secured to the second housing;
   a third secondary gear secured to the third housing; and
   a fourth secondary gear secured to the fourth housing;
   wherein pivoting movement of the first housing causes pivoting movement of the first secondary gear;
   wherein pivoting movement of the second housing causes pivoting movement of the second secondary gear;
   wherein pivoting movement of the third housing causes pivoting movement of the third secondary gear;
   wherein pivoting movement of the fourth housing causes pivoting movement of the fourth secondary gear; and
   wherein the first secondary gear is positioned parallel and opposite to the second secondary gear and third secondary gear is positioned parallel and opposite to the forth secondary gear.

3. The system of claim 2, wherein at least two of the secondary gears are partially teethed around the periphery of the relative secondary gears bodies.

4. The system of claim 2,
   wherein the first primary gear engages and meshes with the first and second secondary gears,
   wherein the second primary gear engages and meshes with the third and fourth secondary gears,
   wherein the primary gears and secondary gears can be located inside the rotation of the rings system.

5. The system of claim 1, the central connecting support assembly comprising:
   a main body comprising first and second central connecting supports;
   a first connecting rod is connected to the main body of the central connecting support and adapted to engage with the first housing;
   a second connecting rod is connected to the main body of the central connecting support and adapted to engage with the second housing;
   a third connecting rod is connected to the main body of the central connecting support and adapted to engage with the third housing;
   a fourth connecting rod is connected to the main body of the central connecting support and adapted to engage with the fourth housing.

6. The system of claim 5, further comprising:
   an oil shroud container configured to fit around the CV joint assembly to protect against impurities and/or liquids.

7. The system of claim 6, the oil shroud comprising:
   a spherical body having a plurality of sections configured to bend relative to each other.

8. The system of claim 7, the constant velocity (CV) joint assembly is configured to have a pitch and roll range of motion independent of each other.

9. The system of claim 7, the constant velocity (CV) joint assembly is configured to receive rotatable input and output shafts.

10. The system of claim 5, further comprising:
    a first nob replaces the first connecting rod;
    a second nob replaces the second connecting rod;
    a first actuator rotatably secured to first nob; and
    a second actuator rotatably secured to the second nob.

11. The system of claim 10, the constant velocity (CV) joint assembly is configured to be as a robotic system assembly configured to have a pitch and roll range of motion independent of each other.

12. The system of claim 11, the robotic system assembly is configured to move linearly on two additional planes.

13. The system of claim 12, the robotic system assembly is configured to receive a rotatable input shaft.

14. The system of claim 1, wherein the first and second lower sliding supports are configured as rectangular blocks having side cuts.

* * * * *